(12) United States Patent
Li et al.

(10) Patent No.: US 11,190,257 B2
(45) Date of Patent: Nov. 30, 2021

(54) METHOD AND DEVICE FOR FEEDING BACK CHANNEL STATE INFORMATION, AND METHOD AND DEVICE FOR DETERMINING PRE-CODING MATRIX

(71) Applicant: DATANG MOBILE COMMUNICATIONS EQUIPMENT CO., LTD., Beijing (CN)

(72) Inventors: Hui Li, Beijing (CN); Qiubin Gao, Beijing (CN); Tamrakar Rakesh, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/973,056

(22) PCT Filed: May 30, 2019

(86) PCT No.: PCT/CN2019/089337
§ 371 (c)(1),
(2) Date: Dec. 8, 2020

(87) PCT Pub. No.: WO2019/233340
PCT Pub. Date: Dec. 12, 2019

(65) Prior Publication Data
US 2021/0273708 A1    Sep. 2, 2021

(30) Foreign Application Priority Data

Jun. 8, 2018  (CN) .......................... 201810590080.9
Sep. 21, 2018 (CN) .......................... 201811108689.4
Feb. 15, 2019 (CN) .......................... 201910117823.5

(51) Int. Cl.
*H04B 7/02* (2018.01)
*H04B 7/06* (2006.01)
(Continued)

(52) U.S. Cl.
CPC ......... *H04B 7/0626* (2013.01); *H04B 7/0452* (2013.01); *H04B 7/0456* (2013.01)

(58) Field of Classification Search
CPC ... H04B 7/0626; H04B 7/0456; H04B 7/0452
(Continued)

(56) References Cited

U.S. PATENT DOCUMENTS 8,885,749 B2 * 11/2014 Wernersson ......... H04B 7/0617
375/267
2013/0107920 A1 * 5/2013 Kim .................... H04B 7/0456
375/219
(Continued)

FOREIGN PATENT DOCUMENTS

CN    101958770 A    1/2011
CN    102546488 A    7/2012
(Continued)

OTHER PUBLICATIONS

Huawei et al.,"Further enhancements on CSI reporting and codebook design", 3GPP TSG RAN WG1 Meeting #93, Busan, Korea, May 21-25, 2018, total 6 pages, R1-1807128.

*Primary Examiner* — Helene E Tayong
(74) *Attorney, Agent, or Firm* — Kilpatrick Townsend & Stockton, LLP

(57) ABSTRACT

Disclosed are a method and device for feeding back channel state information, and a method and device for determining a pre-coding matrix. In the present application, a terminal determines N orthogonal vector groups, one of the orthogonal vector groups being used for constructing pre-coding corresponding to M layers in a pre-coding matrix; the
(Continued)

terminal determines, according to beams in the N orthogonal vector groups, linear combination coefficients for constructing the pre-coding matrix, the linear combination coefficients includes linear combination coefficients corresponding to the layers in the pre-coding matrix; the terminal feeds back channel state information to a base station, the channel state information includes indication information of the N orthogonal vector groups and linear combination coefficients, in the determined linear combination coefficients of the pre-coding matrix, corresponding to Y layers, wherein Y is less than or equal to the number of layers of the pre-coding matrix.

20 Claims, 3 Drawing Sheets

(51) Int. Cl.
H04B 7/0456 (2017.01)
H04B 7/0452 (2017.01)

(58) Field of Classification Search
USPC .......................................................... 375/267
See application file for complete search history.

(56) References Cited

U.S. PATENT DOCUMENTS

| 2013/0230081 | A1* | 9/2013 | Wernersson | H04B 7/0617 375/219 |
| 2014/0177745 | A1* | 6/2014 | Krishnamurthy | H04B 7/0413 375/267 |
| 2014/0313976 | A1* | 10/2014 | Tian | H04B 7/10 370/328 |
| 2015/0289155 | A1* | 10/2015 | Gao | H04L 5/0057 370/252 |
| 2016/0134437 | A1 | 5/2016 | Li et al. | |
| 2016/0142117 | A1* | 5/2016 | Rahman | H04B 7/0469 375/267 |
| 2017/0257156 | A1* | 9/2017 | Ko | H04L 5/0023 |
| 2017/0302353 | A1 | 10/2017 | Rahman et al. | |
| 2018/0034519 | A1 | 2/2018 | Rahman et al. | |
| 2018/0145737 | A1 | 5/2018 | Rahman et al. | |
| 2019/0341979 | A1* | 11/2019 | Gao | H04L 5/00 |

FOREIGN PATENT DOCUMENTS

| CN | 103297180 A | 9/2013 |
| CN | 106685582 A | 5/2017 |
| CN | 106850018 A | 6/2017 |
| CN | 107113040 A | 8/2017 |
| WO | 2012149234 A1 | 11/2012 |
| WO | 2013129985 A1 | 9/2013 |

* cited by examiner

METHOD AND DEVICE FOR FEEDING BACK CHANNEL STATE INFORMATION, AND METHOD AND DEVICE FOR DETERMINING PRE-CODING MATRIX

This application is a national phase entry under 35 U.S.C. § 371 of International Application No. PCT/CN2019/089337, filed on May 30, 2019, which claims the priorities from: Chinese Patent Application No. 201810590080.9 filed with the China National Intellectual Property Administration on Jun. 8, 2018 and entitled "Method and Device for Feeding Back Channel State Information, and Method and Device for Determining Pre-coding Matrix"; Chinese Patent Application No. 201811108689.4 filed with the China National Intellectual Property Administration on Sep. 21, 2018 and entitled "Method and Device for Feeding Back Channel State Information, and Method and Device for Determining Pre-coding Matrix"; and Chinese Patent Application No. 201910117823.5 filed with the China National Intellectual Property Administration on Feb. 15, 2019 and entitled "Method and Device for Feeding Back Channel State Information, and Method and Device for Determining Pre-coding Matrix", the entire content of which is incorporated herein by reference.

FIELD

This application relates to the field of wireless communication technologies, and particularly to a method and device for feeding back channel state information, and a method and device for determining a pre-coding matrix.

BACKGROUND

Two types of codebooks are defined in the New Radio (NR) system: Type I codebook (Type I) and Type II codebook (Type II), The Type I codebook is based on the beam selection and phase adjustment, and has the relatively small feedback overhead and the relatively low channel quantization accuracy. The Type II codebook is based on the linear combination of orthogonal beams, and has the relatively large feedback overhead and the relatively high channel quantization accuracy.

The Type II codebook is based on the way to perform the linear combination of beams in an orthogonal beam group, and supports the rank1 codebook and rank2 codebook. The rank1 indicates that the rank of the transmission channel is equal to 1, which means that one data layer is used for transmission. The rank2 indicates that the rank of the transmission channel is equal to 2, which means that two data layers are used for transmission.

Here, the rank1 codebook is expressed as:

$$W = \begin{bmatrix} \tilde{w}_{0,0} \\ \tilde{w}_{1,0} \end{bmatrix}$$

The rank2 codebook is expressed as:

$$W = \begin{bmatrix} \tilde{w}_{0,0} & \tilde{w}_{0,1} \\ \tilde{w}_{1,0} & \tilde{w}_{1,1} \end{bmatrix}$$

Here, $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}.$$

L represents the number of orthogonal beams in the group; $b_{k_1,k_2}$ represents the orthogonal beams, which uses a two-dimensional Discrete Fourier Transform (DFT) vector; r=0, 1 represents the first and second polarization directions in the dual-polarized antenna array, and l=0, 1 represents the layers. $p_{r,l,i}^{(WB)}$ represents the wideband amplitude quantization factor acting on the beam i in the orthogonal beam group, the polarization direction r and the layer l; $p_{r,l,i}^{(SB)}$ represents the sub-band amplitude quantization factor acting on the beam i in the orthogonal beam group, the polarization direction r and the layer l; and $c_{r,l,i}$ represents the sub-band phase quantization factor acting on the beam i in the orthogonal beam group, the polarization direction r and the layer l. The number of antenna ports supported by such codebook structure is {4, 8, 12, 16, 24, 32}.

According to the above codebook structure, it can be concluded that the Type II codebook needs to determine an orthogonal beam group. Each layer independently linearly combines all the beams in the orthogonal beam group, and quantizes the amplitude and phase of the linear combination coefficient.

SUMMARY

Embodiments of the application provide a method and device for feeding back channel state information, and a method and device for determining a pre-coding matrix.

In a first aspect, a method for feeding back channel state information is provided, including: determining, by a terminal, N orthogonal vector groups; determining linear combination coefficients for constructing a pre-coding matrix according to vectors in the N orthogonal vector groups, the linear combination coefficients including linear combination coefficients corresponding to each layer in the pre-coding matrix; and feeding back, by the terminal, channel state information to a base station, the channel state information including indication information of the N orthogonal vector groups and linear combination coefficients corresponding to Y layers among the determined linear combination coefficients for the pre-coding matrix. Y is less than or equal to the number of layers of the pre-coding matrix. In this method, the beams in the same orthogonal vector group are orthogonal to each other, one orthogonal vector group is used to construct pre-coding corresponding to M layers in the pre-coding matrix, different orthogonal vector groups construct pre-coding corresponding to different layers in the pre-coding matrix, and N and M are both integers greater than or equal to 1.

According to the above embodiments of the application, the terminal determines N orthogonal vector groups, determines linear combination coefficients corresponding to each layer in a pre-coding matrix according to vectors in the N orthogonal vector groups, and then feeds back channel state information to the base station. The channel state information includes indication information of the N orthogonal vector groups and linear combination coefficients corresponding to Y layers among the linear combination coefficients for the pre-coding matrix. Since Y can be smaller than the number of layers of the pre-coding matrix, the feedback overhead can be reduced.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

According to the above embodiments of the application, on the one hand, since the pre-coding of different polarization directions of the same layer is constructed by using the same linear combination coefficient according to the vectors in the same orthogonal vector group, it is only necessary for the pre-coding of different polarization directions of the same layer to determine and feed back the linear combination coefficient corresponding to one polarization direction in this layer, and there is no need to determine and feed back the linear combination coefficients respectively for different polarization directions, thus reducing the feedback overhead. On the other hand, the orthogonality of vectors ensures that the layers corresponding to different orthogonal vector groups are orthogonal to each other.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

According to the above embodiments of the application, on the one hand, when one orthogonal vector group is used to construct the pre-coding of multiple layers, the same polarization directions of different layers among multiple layers corresponding to the same orthogonal vector group may correspond to the same linear combination coefficient. Thus, for the pre-coding of multiple layers corresponding to the same orthogonal vector group, it is enough to determine and feed back the linear combination coefficients corresponding to different polarization directions, and there is no need to determine and feed back the linear combination coefficients respectively for different layers, thus reducing the feedback overhead. On the other hand, among the layers corresponding to different orthogonal vector groups, the orthogonality between the vectors in the orthogonal vector groups can ensure the orthogonality among different layers, so the orthogonality among all the layers in the pre-coding matrix can be achieved, and the inter-layer interference is reduced.

In a possible implementation, the channel state information further includes: phase adjustment factors corresponding to S layers in the pre-coding matrix determined by the terminal, S is less than or equal to the number of layers of the pre-coding matrix.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or a sub-band phase quantization factor(s).

In a possible implementation, the number of vectors in each of the N orthogonal vector groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a possible implementation, when the orthogonal vector groups are orthogonal beam groups, determining, by the terminal, linear combination coefficients for constructing the pre-coding matrix according to vectors in the N orthogonal vector groups, includes: determining, by the terminal, S frequency-domain basis vector groups, S being an integer greater than or equal to 1; and determining, by the terminal, linear combination coefficients for constructing the pre-coding matrix according to beam vectors in the N orthogonal beam groups and the S frequency-domain basis vector groups.

In a possible implementation, among the S frequency-domain basis vector groups, frequency-domain basis vectors in a frequency-domain basis vector group used by a layer with a larger layer index are selected from a frequency-domain basis vector group used by a layer with a smaller layer index.

In a possible implementation, when the orthogonal vector groups are frequency-domain basis vector groups, determining, by the terminal, linear combination coefficients for constructing the pre-coding matrix according to vectors in the N orthogonal vector groups, includes: determining, by the terminal, S beam groups, S being an integer greater than or equal to 1; and determining, by the terminal, linear combination coefficients for constructing the pre-coding matrix according to vectors in the N frequency-domain basis vector groups and the S beam groups.

In a possible implementation, among the S beam groups, beam vectors in a beam group used by a layer with a larger layer index are selected from a beam group used by a layer with a smaller layer index.

In a second aspect, a method for determining a pre-coding matrix is provided, including: receiving, by a base station, channel state information fed back by a terminal, the channel state information including indication information of N orthogonal vector groups and linear combination coefficients corresponding to Y layers among linear combination coefficients determined by the terminal for constructing a pre-coding matrix; and constructing, by the base station, the pre-coding matrix according to the channel state information. Here, Y is less than or equal to the number of layers of the pre-coding matrix; and among the N orthogonal vector groups, vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and N and M are both integers greater than or equal to 1.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

In a possible implementation, the channel state information further includes: phase adjustment factors corresponding to S layers in the pre-coding matrix determined by the terminal, S is less than or equal to the number of layers of the pre-coding matrix.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or sub-band phase quantization factor(s).

In a possible implementation, the number of orthogonal beams in each of the N orthogonal beam groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a third aspect, a terminal is provided including an orthogonal beam group determining module configured to determine N orthogonal vector groups. N is an integer greater than or equal to 1. Vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and M is an integer greater than or equal to 1. The terminal further includes a linear combination coefficient determining module configured to determine linear combination coefficients for constructing the pre-coding matrix according to vectors in the N orthogonal vector groups, the linear combination coefficients including linear combination coefficients corresponding to each layer in the pre-coding matrix; and a feedback module configured to feed back channel state information to a base station, the channel state information including indication information of the N orthogonal vector groups and linear combination coefficients corresponding to Y layers among the determined linear combination coefficients for the pre-coding matrix. Y is less than or equal to the number of layers of the pre-coding matrix.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

In a possible implementation, the channel state information further includes: phase adjustment factors corresponding to S layers in the pre-coding matrix determined by the terminal, S is less than or equal to the number of layers of the pre-coding matrix.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or sub-band phase quantization factor(s).

In a possible implementation, the number of vectors in each of the N orthogonal vector groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a possible implementation, when the orthogonal vector groups are orthogonal beam groups, the linear combination coefficient determining module is specifically configured to: determine S frequency-domain basis vector groups, S being an integer greater than or equal to 1; and determine linear combination coefficients for constructing the pre-coding matrix according to beam vectors in the N orthogonal beam groups and the S frequency-domain basis vector groups.

In a possible implementation, among the S frequency-domain basis vector groups, frequency-domain basis vectors in a frequency-domain basis vector group used by a layer with a larger layer index are selected from a frequency-domain basis vector group used by a layer with a smaller layer index.

In a possible implementation, when the orthogonal vector groups are frequency-domain basis vector groups, the linear combination coefficient determining module is specifically configured to: determine S beam groups, S being an integer greater than or equal to 1; and determine linear combination coefficients for constructing the pre-coding matrix according to vectors in the N frequency-domain basis vector groups and the S beam groups.

In a possible implementation, among the S beam groups, beam vectors in a beam group used by a layer with a larger layer index are selected from a beam group used by a layer with a smaller layer index.

In a fourth aspect, a base station is provided, including: a receiving module configured to receive channel state information fed back by a terminal. The channel state information includes indication information of N orthogonal vector groups and linear combination coefficients corresponding to Y layers among linear combination coefficients determined by the terminal for constructing a pre-coding matrix, Y is less than or equal to the number of layers of the pre-coding matrix; among the N orthogonal vector groups, vectors in a same orthogonal vector group are orthogonal to each other, vectors of different orthogonal vector groups are orthogonal to each other, one orthogonal vector group is used to construct pre-coding corresponding to M layers in the pre-coding matrix, different orthogonal vector groups construct pre-coding corresponding to different layers in the pre-coding matrix, and N and M are both integers greater than or equal to 1. The base station further includes a pre-coding matrix determining module configured to construct the pre-coding matrix according to the channel state information.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

In a possible implementation, the channel state information further includes: phase adjustment factors corresponding to S layers in the pre-coding matrix determined by the terminal, S is less than or equal to the number of layers of the pre-coding matrix.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or sub-band phase quantization factor(s).

In a possible implementation, the number of orthogonal beams in each of the N orthogonal beam groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a fifth aspect, a communication device is provided, including: a processor, a memory and a transceiver. The processor is configured to read a program in the memory to: determine N orthogonal vector groups, N being an integer greater than or equal to 1; determine linear combination coefficients for constructing a pre-coding matrix according to vectors in the N orthogonal vector groups, the linear combination coefficients including linear combination coefficients corresponding to each layer in the pre-coding matrix; and feed back channel state information to a base station via the transceiver, the channel state information including indication information of the N orthogonal vector groups and linear combination coefficients corresponding to Y layers among the determined linear combination coefficients for the pre-coding matrix. Y is less than or equal to the number of layers of the pre-coding matrix. In this method, the vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and M is an integer greater than or equal to 1.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

In a possible implementation, the channel state information further includes: phase adjustment factors corresponding to S layers in the pre-coding matrix determined by the terminal, S is less than or equal to the number of layers of the pre-coding matrix, and the selection of the S layers is predefined by the system or indicated to the terminal by high-level signaling.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or sub-band phase quantization factor(s).

In a possible implementation, the number of vectors in each of the N orthogonal vector groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a possible implementation, when the orthogonal vector groups are orthogonal beam groups, the processor is specifically configured to: determine S frequency-domain basis vector groups, S being an integer greater than or equal to 1; and determine linear combination coefficients for constructing the pre-coding matrix according to beam vectors in the N orthogonal beam groups and the S frequency-domain basis vector groups.

In a possible implementation, among the S beam groups, beam vectors in a beam group used by a layer with a larger layer index are selected from a beam group used by a layer with a smaller layer index.

In a possible implementation, when the orthogonal vector groups are frequency-domain basis vector groups, the processor is specifically configured to: determine S beam groups, S being an integer greater than or equal to 1; and determine linear combination coefficients for constructing the pre-coding matrix according to vectors in the N frequency-domain basis vector groups and the S beam groups.

In a possible implementation, among the S beam groups, beam vectors in a beam group used by a layer with a larger layer index are selected from a beam group used by a layer with a smaller layer index.

In a sixth aspect, a communication device is provided, including: a processor, a memory and a transceiver. The processor is configured to read a program in the memory to: receive the channel state information fed back by a terminal via the transceiver. The channel state information includes indication information of N orthogonal vector groups and linear combination coefficients corresponding to Y layers among linear combination coefficients determined by the terminal for constructing a pre-coding matrix. Y is less than or equal to the number of layers of the pre-coding matrix. The processor is further configured to read a program in the memory to: construct the pre-coding matrix according to the channel state information. Here, among the N orthogonal vector groups, vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and N and M are both integers greater than or equal to 1.

In a possible implementation, vectors in the different orthogonal vector groups are orthogonal to each other.

In a possible implementation, in the linear combination coefficients for the pre-coding matrix, different polarization directions of a same layer correspond to a same linear combination coefficient, and layers corresponding to a same orthogonal vector group are orthogonal to each other through phase adjustment factors.

In a possible implementation, in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

In a possible implementation, the channel state information further includes: phase adjustment factors corresponding to S layers in the pre-coding matrix determined by the terminal, S is less than or equal to the number of layers of the pre-coding matrix.

In a possible implementation, the linear combination coefficients include the following parameters: amplitude quantization factors including wideband amplitude quantization factor(s) and/or sub-band amplitude quantization factor(s); and phase quantization factors including wideband phase quantization factor(s) and/or sub-band phase quantization factor(s).

In a possible implementation, the number of vectors in each of the N orthogonal vector groups is same or different.

In a possible implementation, the orthogonal vector group is an orthogonal beam group which includes at least one beam vector; or, the orthogonal vector group is a frequency-domain basis vector group which includes at least one frequency-domain basis vector.

In a seventh aspect, a computer readable storage medium is provided. The computer readable storage medium stores computer executable instructions which are configured to cause the computer to perform the method described in any implementation in the first aspect described above.

In an eighth aspect, a computer readable storage medium is provided. The computer readable storage medium stores computer executable instructions which are configured to cause the computer to perform the method described in any implementation in the second aspect described above.

DETAILED DESCRIPTION OF THE EMBODIMENTS

The current Type II codebook only supports the rank1 and rank2, and does not support the higher rank values. For the high-rank Type II codebooks, if the above schemes of the rank1 codebook and rank2 codebook are referred to, for example, for the rank3 codebook, the linear combination coefficients of three layers are independently determined and fed back; for the rank4 codebook, the linear combination coefficients of four layers are independently determined and fed back, then the feedback overhead is increased due to the increase in the number of layers. On the other hand, since the linear combination coefficient of each layer is determined independently and the orthogonality cannot be guaranteed between layers, the inter-data layer interference will produced during the data transmission, which affects the performance of the system. Such effect is more obvious for the high-rank codebooks.

Embodiments of the application proposes a method for feeding back channel state information, which can perform the channel state information feedback based on a pre-coding matrix of beam linear combination, so that the base station can construct the pre-coding matrix according to the received channel state information. The embodiments of the application can support the higher rank, and also balance the feedback overhead and reduce the inter-layer interference.

The embodiments of the application will be described below in details with reference to the drawings.

Figure 1:
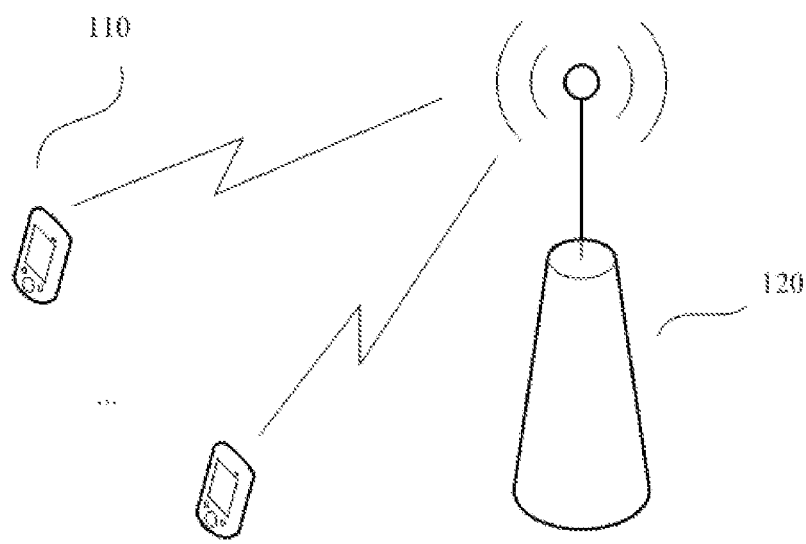
FIG. 1 is a schematic diagram of a network architecture involved in an embodiment of the present application.

Referring to FIG. 1, it is a schematic diagram of a possible communication scenario provided by an embodiment of the application. As shown in FIG. 1, a terminal 110 accesses a wireless network through a Radio Access Network (RAN) node 120 to obtain the services from an external network node (e.g., Internet) through the wireless network, or communicate with other terminals through the wireless network.

Here, the terminal is also called User Equipment (UE), Mobile Station (MS), Mobile Terminal (MT), etc., and is a device for providing the voice and/or data connectivity to the user, e.g., a handheld device with the wireless connection function, a vehicle-carried device with the wireless connection function, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

The RAN is a part in the network that connects a terminal to the wireless network. The RAN node (or device) is a node (or device) in the radio access network, and can also be called base station. At present, some examples of the RAN nodes are: gNB, Transmission Reception Point (TRP), evolved Node B (eNB), Radio Network Controller (RNC), Node B (NB), Base Station Controller (BSC), Base Transceiver Station (BTS), home base station (for example, home evolved NodeB or Home Node B (HNB)), Base Band Unit (BBU), or Wireless Fidelity (WiFi) Access Point (AP), etc. Furthermore, in a network structure, the RAN may include a Centralized Unit (CU) node and a Distributed Unit (DU) node.

The above-mentioned communication architecture may be a 5G system or its evolved system.

Embodiments of the application are described by taking base station and terminal as an example. Here, the terminal can feed back the channel state information to the base station, so that the base station constructs a pre-coding matrix according to the channel state information and thus performs the data transmission with the terminal based on the pre-coding matrix.

In embodiments of the application, the terminal feeds back the channel state information for constructing the pre-coding matrix to the base station based on N orthogonal vector groups and the construction of the pre-coding matrix, and the base station constructs the pre-coding matrix according to the N orthogonal vector groups and the channel state information fed back by the terminal and based on the construction of the pre-coding matrix, so as to perform the data transmission with the terminal based on the pre-coding matrix.

The orthogonal vector groups may be orthogonal beam groups, and one orthogonal beam group includes at least one beam vector (also called orthogonal beam, or beam for short). The orthogonal vector groups may also be frequency-domain basis vector groups, and one frequency-domain basis vector group includes at least one frequency-domain basis vector.

Here, the number of orthogonal beams in each of the N orthogonal beam groups may be same or different. The number of frequency-domain basis vectors in each of the N frequency-domain basis vector groups may be same or different.

Here, in the N orthogonal beam groups, the beams in the same orthogonal beam group are orthogonal to each other, and the beams among different orthogonal beam groups are orthogonal to each other. One orthogonal beam group is used to construct the pre-coding corresponding to M layers in the pre-coding matrix, and different orthogonal beam groups construct the pre-coding corresponding to different layers in the pre-coding matrix. M and N are both integers greater than or equal to 1. In the N frequency-domain basis vector groups, the frequency-domain basis vectors in the same frequency-domain basis vector group are orthogonal to each other, and the frequency-domain basis vectors among different frequency-domain basis vector groups are orthogonal to each other. One frequency-domain basis vector group is used to construct the pre-coding corresponding to M layers in the pre-coding matrix, and different frequency-domain basis vector groups construct the pre-coding corresponding to different layers in the pre-coding matrix. M and N are both integers greater than or equal to 1.

In one embodiment, the value of M may be defined by the system. For example, the system may define that one orthogonal beam group is used to construct the pre-coding corresponding to two layers in the pre-coding matrix. Since each column in the pre-coding matrix corresponds to a layer, one orthogonal beam group or one frequency-domain basis vector group is used to construct the pre-coding corresponding to two layers in the pre-coding matrix, which also means that one orthogonal beam group or one frequency-domain basis vector group is used to construct 2-column pre-coding in the pre-coding matrix.

In one embodiment, the N orthogonal beam groups may be constituted by selecting partial beams from the candidate beam set. The terminal may determine the candidate beam set according to the codebook parameters configured by the base station and the information predefined by the system. The system may predefine that one orthogonal beam group is used to construct the pre-coding corresponding to several layers in the pre-coding matrix, and the codebook parameters configured by the base station may include the number of Channel State Information Reference Signal (CSI-RS) ports.

For example, the codebook parameters configured by the base station may include: the number of CSI-RS ports in one polarization direction is $(N_1, N_2)=(4, 2)$, and the total number of CSI-RS ports is $2 \cdot N_1 \cdot N_2 = 16$. The system may predefine the number of beams in each orthogonal beam group as L=4, and may predefine the corresponding oversampling factor as $(\varphi_1, O_2)=(4, 4)$ for the case when the number of CSI-RS ports is $(N_1, N_2)$.

Figure 2:
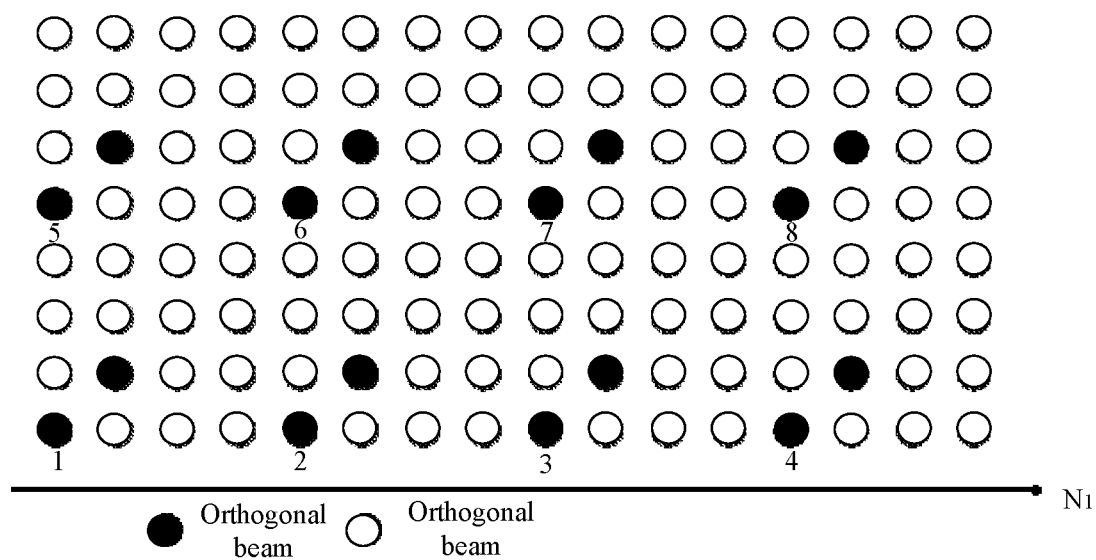
FIG. 2 is a schematic diagram of a candidate beam set in an embodiment of the present application.

The terminal may determine that $N_1 \cdot O_1 \cdot N_2 \cdot O_2 = 128$ beams are included in the candidate beam set according to the codebook parameters configured by the base station and the information predefined by the system. As shown in FIG. 2, since the oversampling factor is 4, the beams spaced every 4 beams in the $N_1$ or $N_2$ direction are mutually orthogonal beams. For example, 8 beams identified as 1 to 8 are all orthogonal to each other, and the other 8 dark-filled beams are all orthogonal to each other.

In one embodiment, the N frequency-domain basis vector groups may be constituted by selecting a part of the frequency-domain basis vectors from a set of candidate frequency-domain basis vectors. The terminal may determine the set of candidate frequency-domain basis vectors according to the codebook parameters configured by the base station and the information predefined by the system. The system may predefine that one frequency-domain basis vector group is used to construct the pre-coding corresponding to several layers in the pre-coding matrix, and the codebook parameters configured by the base station may include the number of CSI-RS ports.

In the embodiments of the application, the structure of the pre-coding matrix may adopt the construction of a first kind of pre-coding matrix or the construction of a second kind of pre-coding matrix, which will be described below respectively.

(1) The Construction of the First Kind of Pre-Coding Matrix

The construction of the first kind of pre-coding matrix has the following characteristics: the pre-coding of different polarization directions of the same layer is constructed according to the beams in the same orthogonal beam group or the frequency-domain basis vectors in the same frequency-domain basis vector group and by using the same linear combination coefficient, and the difference between different polarization directions is one phase adjustment factor. The layers corresponding to the same orthogonal beam group or the same frequency-domain basis vector group keep orthogonal to each other through the phase adjustment factor, and the layers corresponding to different orthogonal beam groups or different frequency-domain basis vector groups keep orthogonal to each other through the orthogonality of the beams in the orthogonal beam groups.

Taking rank=3 (that is, the rank of the pre-coding matrix is 3 and the number of layers is 3) and two polarization directions as an example, the system pre-defines that each orthogonal beam group or each frequency-domain basis vector group corresponds to two layers in the pre-coding matrix. That is, the layer 0 and layer 1 correspond to the first orthogonal beam group or the first frequency-domain basis vector group, and the layer 2 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {3, 4, 5, 6} or the second frequency-domain basis vector group contains the frequency-domain basis vectors {3, 4, 5, 6}. The pre-coding matrix constructed based on the first type of pre-coding matrix may be expressed as:

$$W = \begin{bmatrix} \tilde{w}_{0,0} & \tilde{w}_{0,1} \tilde{w}_{0,2} \\ \tilde{w}_{1,0} & \tilde{w}_{1,1} \tilde{w}_{1,2} \end{bmatrix} = \begin{bmatrix} \tilde{w}_{0,0} & \tilde{w}_{0,1} & \tilde{w}_{0,2} \\ \varphi_n \tilde{w}_{0,0} & -\varphi_n \tilde{w}_{0,1} & \varphi'_n \tilde{w}_{0,2} \end{bmatrix} \quad (1)$$

Here, each column (two blocks) of the block matrix corresponds to one layer, and each row (one block) corresponds to one polarization direction. The pre-coding in the pre-coding matrix may be expressed as:

$$\tilde{w}_{0,1} = \sum_{i=0}^{L-1} b_i^{(\lfloor \frac{l}{2} \rfloor)} \cdot p_{0,l,i}^{(WB)} \cdot p_{0,l,i}^{(SB)} \cdot c_{0,l,i} \quad (2)$$

Here, taking the orthogonal beam group as an example, the relevant parameters in the above expression are illustrated as follows (the principle is the same in case of the frequency-domain basis vector group):

L represents the number of beams in the orthogonal beam group, and in this example, L=4;

l represents layer, and in this example, since the pre-coding rank is rank=3, l=0, 1, 2;

$$b_i^{(\lfloor \frac{l}{2} \rfloor)}$$

represents the i$^{th}$ beam in the $$\left\lfloor \frac{l}{2} \right\rfloor + 1^{th}$$

orthogonal beam group, and may use the 2D DFT vector. According to this expression, the predefinition by the system and two selected orthogonal beam groups (i.e., the first orthogonal beam group and the second orthogonal beam group), the layer 0 and layer 1 (that is, when l=0, 1) use the beams {1, 2, 7, 8} in the first orthogonal beam group; and the layer 2 (that is, when l=2) uses the beams {3, 4, 5, 6} in the second orthogonal beam group;

$p_{0,l,i}^{(WB)}$ represents the wideband amplitude quantization factor acting on the beam i in the orthogonal beam group, the first polarization direction and the layer l;

$p_{0,l,i}^{(SB)}$ represents the sub-band amplitude quantization factor acting on the beam i in the orthogonal beam group, the first polarization direction and the layer l;

$c_{0,l,i}$ represents the sub-band phase quantization factor acting on the beam i in the orthogonal beam group, the first polarization direction and the layer l;

$\varphi_n$ and $\varphi'_n$ represent the phase adjustment factors used to adjust the phase between beams in the two polarization directions, and its value may be $$\varphi_n, \varphi'_n = e^{j\frac{\pi n}{2}},$$

where n=0, 1. The phase adjustment factors can ensure the orthogonality between the first two columns in the pre-coding matrix corresponding to the first orthogonal beam group.

In some other embodiments, for the codebook structure based on DFT compression, taking rank=3 (that is, the rank of the pre-coding matrix is 3 and the number of layers is 3) and two polarization directions as an example, the system pre-defines that each orthogonal beam group or frequency-domain basis vector group corresponds to two layers in the pre-coding matrix. That is, the layer 0 and layer 1 correspond to the first orthogonal beam group or the first frequency-domain basis vector group, and the layer 2 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {3, 4} or the second frequency-domain basis vector group contains the frequency-domain basis vectors {3, 4}. The pre-coding matrix constructed based on the first type of pre-coding matrix may be expressed as:

$$W = \begin{bmatrix} \tilde{w}_{0,0} & \tilde{w}_{0,1} \tilde{w}_{0,2} \\ \tilde{w}_{1,0} & \tilde{w}_{1,1} \tilde{w}_{1,2} \end{bmatrix} = \begin{bmatrix} \tilde{w}_{0,0} & \tilde{w}_{0,1} & \tilde{w}_{0,2} \\ \varphi_n \tilde{w}_{0,0} & -\varphi_n \tilde{w}_{0,1} & \varphi'_n \tilde{w}_{0,2} \end{bmatrix} \quad (3)$$

Here, each column (two blocks) of the block matrix corresponds to one layer, and each row (one block) corresponds to one polarization direction. The pre-coding in the pre-coding matrix may be expressed as:

For l=0, 1:

$$\tilde{w}_{0,l} = [v_0^{(0)} \; v_1^{(0)} \; \cdots \; v_{L_0-1}^{(0)}] \cdot \quad (4)$$

$$\begin{bmatrix} p_{0,0,l} \cdot c_{0,0,l} & p_{0,1,l} \cdot c_{0,1,l} & \cdots & p_{0,M_0-1,l} \cdot c_{0,M_0-1,l} \\ p_{1,0,l} \cdot c_{1,0,l} & p_{1,1,l} \cdot c_{1,1,l} & \cdots & p_{1,M_0-1,l} \cdot c_{1,M_0-1,l} \\ \vdots & & & \vdots \\ p_{L_0-1,0,l} \cdot c_{L_0-1,0,l} & p_{L_0-1,1,l} \cdot c_{L_0-1,1,l} & \cdots & p_{L_0-1,M_0-1,l} \cdot c_{L_0-1,M_0-1,l} \end{bmatrix}$$

$$\left[ f_{k_0}^{(0)} \; f_{k_1}^{(0)} \; \cdots \; f_{k_{M_0-1}}^{(0)} \right]^H$$

For l=2:

$$\tilde{w}_{0,l} = [v_0^{(0)} \; v_1^{(0)} \; \cdots \; v_{L_1-1}^{(0)}] \cdot \quad (5)$$

$$\begin{bmatrix} p_{0,0,l} \cdot c_{0,0,l} & p_{0,1,l} \cdot c_{0,1,l} & \cdots & p_{0,M_0-1,l} \cdot c_{0,M_0-1,l} \\ p_{1,0,l} \cdot c_{1,0,l} & p_{1,1,l} \cdot c_{1,1,l} & \cdots & p_{1,M_1-1,l} \cdot c_{1,M_1-1,l} \\ \vdots & & & \vdots \\ p_{L_1-1,0,l} \cdot c_{L_1-1,0,l} & p_{L_1-1,1,l} \cdot c_{L_1-1,1,l} & \cdots & p_{L_1-1,M_1-1,l} \cdot c_{L_1-1,M_1-1,l} \end{bmatrix}$$

$$\left[ f_{k_0}^{(0)} \; f_{k_1}^{(0)} \; \cdots \; f_{k_{M_1-1}}^{(0)} \right]^H$$

Here, taking the orthogonal beam group as an example, the relevant parameters in the above expression are illustrated as follows (the principle is the same in case of the frequency-domain basis vector group):

$L_0$, $L_1$ represent the number of beams in the orthogonal beam group, and the values thereof may be same or different. In this example, $L_0=4$, $L_1=2$;

l represents layer, and in this example, since the pre-coding rank is rank=3, l=0, 1, 2;

$v_i^{(n)}$ represents the $i^{th}$ beam in the orthogonal beam group n, and may use the 2D DFT vector. According to this expression, the predefinition by the system and two selected orthogonal beam groups (i.e., the first orthogonal beam group and the second orthogonal beam group), the layer 0 and layer 1 (that is, when l=0, 1) use the beams {1, 2, 7, 8} in the first orthogonal beam group; and the layer 2 (that is, when l=2) uses the beams {3, 4} in the second orthogonal beam group; $f_{k_i}^{(n)}$ represents the frequency-domain basis vector that is compressed in frequency domain, and the DFT vector can be used. It is selected from a set of N3O3 DFT basis vectors, N3 is related to the number of sub-band CQIs configured by the system, and O3 is the oversampling factor. Each layer uses one frequency-domain basis vector group. The frequency-domain basis vector groups of different layers may be same or different. For example, the same frequency-domain basis vector group is used in the above layer l=0, 1, including M0 basis vectors $$\left\{ f_{k_0}^{(0)}, f_{k_1}^{(0)}, \ldots, f_{k_{M_0-1}}^{(0)} \right\}.$$

The layer l=2 uses a different frequency-domain basis vector group from the layer l=0, 1, including M1 basis vectors $$\left\{ f_{k_0}^{(1)}, f_{k_1}^{(1)}, \ldots, f_{k_{M_1-1}}^{(1)} \right\}.$$

In one embodiment, M1<M0. In one embodiment, the frequency-domain basis vector group in layer l=2 is selected from the frequency-domain basis vector group in the layer l=0, 1, that is, $$\left\{ f_{k_0}^{(1)}, f_{k_1}^{(1)}, \ldots, f_{k_{M_1-1}}^{(1)} \right\} \in \left\{ f_{k_0}^{(0)}, f_{k_1}^{(0)}, \ldots, f_{k_{M_0-1}}^{(0)} \right\};$$

$p_{i,j,l}$ represents the amplitude quantization factor acting on the beam i in the orthogonal beam group, the basis vector j in the frequency-domain basis vector group, and the layer l;

$c_{i,j,l}$ represents the phase quantization factor acting on the beam i in the orthogonal beam group, the basis vector j in the frequency-domain basis vector group, and the layer l;

$\varphi_n$ and $\varphi'_n$ represent the phase adjustment factors used to adjust the phase between beams in the two polarization directions, and the values thereof may be $$\varphi_n, \varphi'_n = e^{j\frac{\pi n}{2}},$$

where n=0, 1. The phase adjustment factors can ensure the orthogonality between the first two columns in the pre-coding matrix corresponding to the first orthogonal beam group.

As can be seen from the above formula (1) and formula (2), the pre-codings ($\tilde{w}_{0,0}$ and $\tilde{w}_{1,0}$) of two polarization directions corresponding to the layer 0 are both obtained by using the same linear combination coefficient to perform the linear combination on all the vectors in the first orthogonal beam group or the first frequency-domain basis vector group. The pre-codings ($\tilde{w}_{0,1}$ and $\tilde{w}_{1,1}$) of two polarization directions corresponding to the layer 1 are both obtained by using the same linear combination coefficient to perform the linear combination on all the vectors in the first orthogonal beam group or the first frequency-domain basis vector group. The pre-codings ($\tilde{w}_{0,2}$ and $\tilde{w}_{1,2}$) of two polarization directions corresponding to the layer 2 are both obtained by using the same linear combination coefficient to perform the linear combination on all the vectors in the second orthogonal beam group or the second frequency-domain basis vector group.

The layers corresponding to the same orthogonal beam group or the same frequency-domain basis vector group keep orthogonal to each other through the phase adjustment factor, for example, the layer 0 and layer 1 corresponding to the first orthogonal beam group keep orthogonal based on the phase adjustment factor $\varphi_n$, that is, the vectors $$\begin{bmatrix} \tilde{w}_{0,0} \\ \varphi_n \tilde{w}_{0,0} \end{bmatrix}$$

and $$\begin{bmatrix} \tilde{w}_{0,1} \\ -\varphi_n \tilde{w}_{0,1} \end{bmatrix}$$

are orthogonal.

Then taking rank=4 (that is, the rank of the pre-coding matrix is 4 and the number of layers is 4) and two polarization directions as an example, the system pre-defines that each orthogonal beam group or each frequency-domain basis vector group corresponds to two layers in the pre-coding matrix. That is, the layer 0 and layer 1 correspond to the first orthogonal beam group or the first frequency-domain basis vector group, and the layer 2 and layer 3 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {3, 4, 5, 6} or the second frequency-domain basis vector group contains the frequency-domain basis vectors {3, 4, 5, 6}. The pre-coding matrix constructed based on the first type of pre-coding matrix may be expressed as:

$$W = \begin{bmatrix} \tilde{w}_{0,0} & \tilde{w}_{0,1} \tilde{w}_{0,2} \tilde{w}_{0,3} \\ \tilde{w}_{1,0} & \tilde{w}_{1,1} \tilde{w}_{1,2} \tilde{w}_{1,3} \end{bmatrix} = \begin{bmatrix} \tilde{w}_{0,0} & \tilde{w}_{0,1} & \tilde{w}_{0,2} & \tilde{w}_{0,3} \\ \varphi_n \tilde{w}_{0,0} & -\varphi_n \tilde{w}_{0,1} & \varphi'_n \tilde{w}_{0,2} & -\varphi'_n \tilde{w}_{0,3} \end{bmatrix} \quad (6)$$

Here, each column of the matrix corresponds to one layer, and each row corresponds to one polarization direction. The pre-coding in the pre-coding matrix may be expressed as:

$$\tilde{w}_{0,l} = \sum_{i=0}^{L-1} b_i^{\left(\left\lfloor \frac{l}{2} \right\rfloor\right)} \cdot p_{0,l,i}^{(WB)} \cdot p_{0,l,i}^{(SB)} \cdot c_{0,l,i} \quad (7)$$

Here, taking the orthogonal beam group as an example, the relevant parameters in the above expression are illustrated as follows (the principle is the same in case of the frequency-domain basis vector group):

L represents the number of beams in the orthogonal beam group, and in this example, L=4;

l represents layer, and in this example, since the pre-coding rank is rank=4, l=0, 1, 2, 3;

$$b_i^{\left(\left\lfloor \frac{l}{2} \right\rfloor\right)}$$

represents the $i^{th}$ beam in the $$\left\lfloor \frac{l}{2} \right\rfloor + 1^{th}$$

orthogonal beam group, and may use the 2D DFT vector. According to this expression, the predefinition of the system and two selected orthogonal beam groups (i.e., the first orthogonal beam group and the second orthogonal beam group), the layer 0 and layer 1 (that is, when l=0, 1) use the beams {1, 2, 7, 8} in the first orthogonal beam group; and the layer 2 and layer 3 (that is, when l=2, 3) use the beams {3, 4, 5, 6} in the second orthogonal beam group;

$p_{0,l,i}^{(WB)}$ represents the wideband amplitude quantization factor acting on the beam i in in the orthogonal beam group, the first polarization direction and the layer l;

$p_{0,l,i}^{(SB)}$ represents the sub-band amplitude quantization factor acting on the beam i in the orthogonal beam group, the first polarization direction and the layer l;

$c_{0,l,i}$ represents the sub-band phase quantization factor acting on the beam i in the orthogonal beam group, the first polarization direction and the layer l;

$\varphi_n$ and $\varphi'_n$ represent the phase adjustment factors used to adjust the phase between beams in the two polarization directions, and its value may be $$\varphi_n, \varphi'_n = e^{j\frac{\pi n}{2}},$$

where n=0, 1. The phase adjustment factors can ensure the orthogonality between the first two columns in the pre-coding matrix corresponding to the first orthogonal beam group, and ensure the orthogonality between the last two columns in the pre-coding matrix corresponding to the second orthogonal beam group.

As can be seen from the above formula (6) and formula (7), the pre-codings ($\tilde{w}_{0,0}$ and $\tilde{w}_{1,0}$) of two polarization directions corresponding to the layer 0 are both obtained by using the same linear combination coefficients to perform the linear combination on all the vectors in the first orthogonal beam group or the first frequency-domain basis vector group, the pre-codings ($\tilde{w}_{0,1}$ and $\tilde{w}_{1,1}$) of two polarization directions corresponding to the layer 1 are both obtained by using the same linear combination coefficients to perform the linear combination on all the vectors in the first orthogonal beam group or the first frequency-domain basis vector group, the pre-codings ($\tilde{w}_{0,2}$ and $\tilde{w}_{1,2}$) of two polarization directions corresponding to the layer 2 are both obtained by using the same linear combination coefficients to perform the linear combination on all the vectors in the second orthogonal beam group or the second frequency-domain basis vector group, and the pre-codings ($\tilde{w}_{0,3}$ and $\tilde{w}_{1,3}$) of two polarization directions corresponding to the layer 3 are both obtained by using the same linear combination coefficients to perform the linear combination on all the vectors in the second orthogonal beam group or the second frequency-domain basis vector group.

The layers corresponding to the same orthogonal beam group or the same frequency-domain basis vector group keep orthogonal to each other through the phase adjustment factor, for example, the layer 0 and layer 1 corresponding to the first orthogonal beam group keep orthogonal based on the phase adjustment factor $\varphi_n$, that is, the vectors $$\begin{bmatrix} \tilde{w}_{0,0} \\ \varphi_n \tilde{w}_{0,0} \end{bmatrix}$$

and $$\begin{bmatrix} \tilde{w}_{0,1} \\ -\varphi_n \tilde{w}_{0,1} \end{bmatrix}$$

are orthogonal; and for another example, the layer 2 and layer 3 corresponding to the second orthogonal beam group keep orthogonal based on the phase adjustment factor $\varphi_n$, that is, the vectors $$\begin{bmatrix} \tilde{w}_{0,2} \\ \varphi'_n \tilde{w}_{0,2} \end{bmatrix}$$

and $$\begin{bmatrix} \tilde{w}_{0,3} \\ -\varphi'_n \tilde{w}_{0,3} \end{bmatrix}$$

are orthogonal.

(2) The Construction of the Second Kind of Pre-Coding Matrix

The construction of the second type of pre-coding matrix has the following characteristics: in the pre-coding corresponding to the same orthogonal beam group or the same frequency-domain basis vector group, the pre-coding matrixes of different layers in the same polarization direction correspond to the same or different linear combination coefficients, different polarization directions of the same layer correspond to different linear combination coefficients, and the orthogonality between layers is ensured by using the existing vector orthogonalization method.

Here, if the pre-coding matrixes of different layers in the same polarization direction correspond to the same linear combination coefficient in the pre-coding corresponding to the same orthogonal beam group or the same frequency-domain basis vector group, the feedback overhead can be reduced.

Taking rank=3 (that is, the rank of the pre-coding matrix is 3 and the number of layers is 3) and two polarization directions as an example, the system pre-defines that each orthogonal beam group or each frequency-domain basis vector group corresponds to two layers in the pre-coding matrix. That is, the layer 0 and layer 1 correspond to the first orthogonal beam group or the first frequency-domain basis vector group, and the layer 2 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {3, 4, 5, 6} or the second frequency-domain basis vector group contains the frequency-domain basis vectors {3, 4, 5, 6}. The pre-coding matrix constructed based on the second type of pre-coding matrix may be expressed as:

$$W = \begin{bmatrix} \tilde{w}_{0,0} & \tilde{w}_{0,1} & \tilde{w}_{0,2} \\ \tilde{w}_{1,0} & \tilde{w}_{1,1} & \tilde{w}_{1,2} \end{bmatrix} = \begin{bmatrix} \tilde{w}_{0,0} & \tilde{w}_{0,0} & \tilde{w}_{0,2} \\ \tilde{w}_{1,0} & \varphi \tilde{w}_{1,0} & \tilde{w}_{1,2} \end{bmatrix} \quad (8)$$

and each column (two blocks) of the block matrix corresponds to one layer, and each row (one block) corresponds to one polarization direction. The pre-coding in the pre-coding matrix may be expressed as:

$$\tilde{w}_{r,0} = \sum_{i=0}^{L-1} b_i^{(0)} \cdot p_{r,0,i}^{(WB)} \cdot p_{r,0,i}^{(SB)} \cdot c_{r,0,i} \quad (9)$$

$$\tilde{w}_{r,2} = \sum_{i=0}^{L-1} b_i^{(1)} \cdot p_{r,2,i}^{(WB)} \cdot p_{r,2,i}^{(SB)} \cdot c_{r,2,i} \quad (10)$$

Here, taking the orthogonal beam group as an example, the relevant parameters in the above expression are illustrated as follows (the principle is the same in case of the frequency-domain basis vector group):

L represents the number of beams in the orthogonal beam group, and in this example, L=4;

l represents layer, and in this example, since the pre-coding rank is rank=3, l=0, 1, 2;

$b_i^{(0)}$ represents the $i^{th}$ beam in the first orthogonal beam group, and may use the 2D DFT vector; and $b_i^{(1)}$ represents the $i^{th}$ beam in the second orthogonal beam group, and may use the 2D DFT vector. According to this expression, the predefinition and two orthogonal beam groups (i.e., the first orthogonal beam group and the second orthogonal beam group) selected by the system, the layer 0 and layer 1 (that is, when l=0, 1) use the beams {1, 2, 7, 8} in the first orthogonal beam group; and the layer 2 (that is, when l=2) uses the beams {3, 4, 5, 6} in the second orthogonal beam group. The number of beams in the first orthogonal beam group may be different from that in the second orthogonal beam group, for example, the terminal determines that the first orthogonal beam group contains beams {1, 2, 7, 8} and the second orthogonal beam group contains only beams {3, 4}, so the layer 0 and layer 1 (that is, when l=0, 1) use the beams {1, 2, 7, 8} in the first orthogonal beam group, and the layer 2 (that is, when l=2) uses the beams {3, 4} in the second orthogonal beam group;

r represents the polarization direction in the dual-polarized antenna array, r=0, 1 represents the first polarization direction and the second polarization direction in the dual-polarized antenna array;

$p_{r,0,i}^{(WB)}$ represents the wideband amplitude quantization factor acting on the beam i in the orthogonal beam group, the polarization direction r and the layer 0;

$p_{r,0,i}^{(SB)}$ represents the sub-band amplitude quantization factor acting on the beam i in the orthogonal beam group, the polarization direction r and the layer 0;

$c_{r,0,i}$ represents the sub-band phase quantization factor acting on the beam i in the orthogonal beam group, the polarization direction r and the layer 0;

$p_{r,2,i}^{(WB)}$ represents the wideband amplitude quantization factor acting on the beam i in the orthogonal beam group, the polarization direction r and the layer 2;

$p_{r,2,i}^{(SB)}$ represents the sub-band amplitude quantization factor acting on the beam i in the orthogonal beam group, the polarization direction r and the layer 2;

$c_{r,2,i}$ represents the sub-band phase quantization factor acting on the beam i in the orthogonal beam group, the polarization direction r and the layer 2;

$\varphi$ represents the phase adjustment factor, and its value may be $$\phi = -\frac{\tilde{w}_{0,0}^H \cdot \tilde{w}_{0,0}}{\tilde{w}_{1,0}^H \cdot \tilde{w}_{1,0}}.$$

The phase adjustment factors can ensure the orthogonality between the first two columns in the pre-coding matrix corresponding to the first orthogonal beam group.

As can be seen from the above formula (8), formula (9) and formula (10), the pre-codings ($\tilde{w}_{0,0}$ and $\tilde{w}_{1,0}$) of two polarization directions corresponding to the layer 0 are both obtained according to the linearly combined beams of all the vectors in the first orthogonal beam group or the first frequency-domain basis vector group, the pre-codings ($\tilde{w}_{0,1}$ and $\tilde{w}_{1,1}$) of two polarization directions corresponding to the layer 1 are both obtained according to the linearly combined beams of all the vectors in the first orthogonal beam group or the first frequency-domain basis vector group and through the phase adjustment between polarizations, and the pre-codings ($\tilde{w}_{0,2}$ and $\tilde{w}_{1,2}$)) of two polarization directions corresponding to the layer 2 are both obtained according to the linearly combined beams of all the vectors in the second orthogonal beam group or the second frequency-domain basis vector group.

The pre-codings ($\tilde{w}_{0,0}$ and $\tilde{w}_{0,1}$) of the same polarization direction of the layer 0 and layer 1 corresponding to the first orthogonal beam group or the first frequency-domain basis vector group correspond to the same linear combination coefficients, the pre-codings ($\tilde{w}_{1,0}$ and $\tilde{w}_{1,1}$) correspond to the same linear combination coefficients, and the linear combination coefficients corresponding to the pre-codings ($\tilde{w}_{0,0}$ and $\tilde{w}_{0,1}$) are not equal to the linear combination coefficients corresponding to the pre-codings ($\tilde{w}_{1,0}$ and $\tilde{w}_{1,1}$), which are determined independently. The existing vector orthogonalization method is used between the layer 0 and layer 1, to implement the interlayer orthogonalization by determining the phase adjustment factors of two polarization directions in the layer 1.

Taking rank=4 (that is, the rank of the pre-coding matrix is 4 and the number of layers is 4) and two polarization directions as an example, the system pre-defines that each orthogonal beam group or each frequency-domain basis vector group corresponds to two layers in the pre-coding matrix. That is, the layer 0 and layer 1 correspond to the first orthogonal beam group or the first frequency-domain basis vector group, and the layer 2 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {3, 4, 5, 6} or the second frequency-domain basis vector group contains the frequency-domain basis vectors {3, 4, 5, 6}. The pre-coding matrix constructed based on the second type of pre-coding matrix may be expressed as:

$$W = \begin{bmatrix} \tilde{w}_{0,0} & \tilde{w}_{0,1} \tilde{w}_{0,2} \tilde{w}_{0,3} \\ \tilde{w}_{1,0} & \tilde{w}_{1,1} \tilde{w}_{1,2} \tilde{w}_{1,3} \end{bmatrix} = \begin{bmatrix} \tilde{w}_{0,0} & \tilde{w}_{0,0} \tilde{w}_{0,2} \tilde{w}_{0,2} \\ \tilde{w}_{1,0} & \varphi \tilde{w}_{1,0} \tilde{w}_{1,2} \varphi' \tilde{w}_{1,2} \end{bmatrix} \quad (11)$$

Here, each column of the matrix corresponds to one layer, and each row corresponds to one polarization direction. The pre-coding in the pre-coding matrix may be expressed as:

$$\tilde{w}_{r,0} = \sum_{i=0}^{L-1} b_i^{(0)} \cdot p_{r,0,i}^{(WB)} \cdot p_{r,0,i}^{(SB)} \cdot c_{r,0,i} \quad (12)$$

$$\tilde{w}_{r,2} = \sum_{i=0}^{L-1} b_i^{(1)} \cdot p_{r,2,i}^{(WB)} \cdot p_{r,2,i}^{(SB)} \cdot c_{r,2,i} \quad (13)$$

Here, taking the orthogonal beam group as an example, the relevant parameters in the above expression are illustrated as follows (the principle is the same in case of the frequency-domain basis vector group):

L represents the number of beams in the orthogonal beam group, and in this example, L=4;

l represents layer, and in this example, since the pre-coding rank is rank=4, l=0, 1, 2, 3;

$b_i^{(0)}$ represents the $i^{th}$ beam in the first orthogonal beam group, and may use the 2D DFT vector; and $b_i^{(1)}$ represents the $i^{th}$ beam in the second orthogonal beam group, and may use the 2D DFT vector. According to this expression, the predefinition by the system and two selected orthogonal beam groups (i.e., the first orthogonal beam group and the second orthogonal beam group), the layer 0 and layer 1 (that is, when l=0, 1) use the beams {1, 2, 7, 8} in the first orthogonal beam group; and the layer 2 and layer 3 (that is, when l=2, 3) use the beams {3, 4, 5, 6} in the second orthogonal beam group. The number of beams in the first orthogonal beam group may be different from that in the second orthogonal beam group, for example, the terminal determines that the first orthogonal beam group contains beams {1, 2, 7, 8} and the second orthogonal beam group contains only beams {3, 4}, so the layer 0 and layer 1 (that is, when l=0, 1) use the beams {1, 2, 7, 8} in the first orthogonal beam group, and the layer 2 and layer 3 (that is, when l=2, 3) use the beams {3, 4} in the second orthogonal beam group;

r represents the polarization direction in the dual-polarized antenna array, r=0, 1 represents the first polarization direction and the second polarization direction in the dual-polarized antenna array;

$p_{r,0,i}^{(WB)}$ represents the wideband amplitude quantization factor acting on the beam i in the orthogonal beam group, the polarization direction r and the layer 0;

$p_{r,0,i}^{(SB)}$ represents the sub-band amplitude quantization factor acting on the beam i in the orthogonal beam group, the polarization direction r and the layer 0;

$c_{r,0,i}$ represents the sub-band phase quantization factor acting on the beam i in the orthogonal beam group, the polarization direction r and the layer 0;

$p_{r,2,i}^{(WB)}$ represents the wideband amplitude quantization factor acting on the beam i in the orthogonal beam group, the polarization direction r and the layer 2;

$p_{r,2,i}^{(SB)}$ represents the sub-band amplitude quantization factor acting on the beam i in the orthogonal beam group, the polarization direction r and the layer 2;

$c_{r,2,i}$ represents the sub-band phase quantization factor acting on the beam i in the orthogonal beam group, the polarization direction r and the layer 2;

and φ and φ' represent the phase adjustment factors, and the values thereof may be $$\phi = -\frac{\tilde{w}_{0,0}^H \cdot \tilde{w}_{0,0}}{\tilde{w}_{1,0}^H \cdot \tilde{w}_{1,0}}$$

and $$\phi = -\frac{\tilde{w}_{0,2}^H \cdot \tilde{w}_{0,2}}{\tilde{w}_{1,2}^H \cdot \tilde{w}_{1,2}}.$$

The phase adjustment factor φ can ensure the orthogonality between the first two columns in the pre-coding matrix corresponding to the first orthogonal beam group, and the phase adjustment factor φ' can ensure the orthogonality between the last two columns in the pre-coding matrix corresponding to the second orthogonal beam group.

As can be seen from the above formula (11), formula (12) and formula (13), the pre-codings ($\tilde{w}_{0,0}$ and $\tilde{w}_{0,1}$ and $\tilde{w}_{1,1}$) of two polarization directions corresponding respectively to the layer 0 and layer 1 are both obtained according to the linearly combined beams of all the vectors in the first orthogonal beam group or the first frequency-domain basis vector group, and the pre-codings ($\tilde{w}_{0,2}$ and $\tilde{W}_{1,2}$, $\tilde{w}_{0,3}$ and $\tilde{w}_{1,3}$) of two polarization directions corresponding respectively to the layer 2 and layer 3 are both obtained according to the linearly combined beams of all the vectors in the second orthogonal beam group or the second frequency-domain basis vector group.

The pre-codings ($\tilde{w}_{0,0}$ and $\tilde{w}_{0,1}$) of the same polarization direction of the layer 0 and layer 1 corresponding to the first orthogonal beam group or the first frequency-domain basis vector group correspond to the same linear combination coefficients, the pre-codings ($\tilde{w}_{1,0}$ and $\tilde{w}_{1,1}$) correspond to the same linear combination coefficients, and the linear combination coefficients corresponding to the pre-codings ($\tilde{w}_{0,0}$ and $\tilde{w}_{0,1}$) are not equal to the linear combination coefficients corresponding to the pre-codings ($\tilde{W}_{1,0}$ and $\tilde{w}_{1,1}$), which are determined independently. The existing vector orthogonalization method is used between the layer 0 and layer 1, to implement the interlayer orthogonalization by determining the phase adjustment factors of two polarization directions in the layer 1. The pre-codings ($\tilde{w}_{0,2}$ and $\tilde{w}_{0,3}$) of the same polarization direction of the layer 2 and layer 3 corresponding to the second orthogonal beam group or the second frequency-domain basis vector group correspond to the same linear combination coefficients, the pre-codings ($\tilde{w}_{1,2}$ and $\tilde{w}_{1,3}$) correspond to the same linear combination coefficients, and the linear combination coefficients corresponding to the pre-codings ($\tilde{w}_{0,2}$ and $\tilde{w}_{0,3}$) are not equal to the linear combination coefficients corresponding to the pre-codings ($\tilde{w}_{1,2}$ and $\tilde{w}_{1,3}$), which are determined independently. The existing vector orthogonalization method is used between the layer 2 and layer 3, to implement the interlayer orthogonalization by determining the phase adjustment factors of two polarization directions in the layer 3.

(3) The Construction of the Third Kind of Pre-Coding Matrix

The construction of the third kind of pre-coding matrix has the following characteristics: the pre-coding of different polarization directions of the same layer is constructed by using the same linear combination coefficients, and the difference between different polarization directions is one phase adjustment factor. The layers corresponding to the same frequency-domain basis vector group keep orthogonal to each other through the phase adjustment factor, and the layers corresponding to different frequency-domain basis vector groups keep orthogonal to each other through the orthogonality of the basis vectors in the frequency-domain basis vector groups.

For the codebook structure based on DFT compression, taking rank=3 (that is, the rank of the pre-coding matrix is 3 and the number of layers is 3) and two polarization directions as an example, the system pre-defines that each orthogonal beam group or frequency-domain basis vector group corresponds to two layers in the pre-coding matrix. That is, the layer 0 and layer 1 correspond to the first orthogonal beam group or the first frequency-domain basis vector group, and the layer 2 corresponds to the second orthogonal beam group or the second frequency-domain basis vector group. According to FIG. 2, the terminal determines that the first orthogonal beam group contains the beams {1, 2, 7, 8} or the first frequency-domain basis vector group contains the frequency-domain basis vectors {1, 2, 7, 8}, and the second orthogonal beam group contains the beams {1, 2} or the second frequency-domain basis vector group contains the frequency-domain basis vectors {1, 2}. At this time, two orthogonal beam groups or two frequency-domain basis vector groups are not orthogonal. The pre-coding matrix constructed based on the first type of pre-coding matrix may be expressed as:

$$W = \begin{bmatrix} \tilde{w}_{0,0} & \tilde{w}_{0,1}\tilde{w}_{0,2} \\ \tilde{w}_{1,0} & \tilde{w}_{1,1}\tilde{w}_{1,2} \end{bmatrix} = \begin{bmatrix} \tilde{w}_{0,0} & \tilde{w}_{0,1} & \tilde{w}_{0,2} \\ \varphi_n \tilde{w}_{0,0} & -\varphi_n \tilde{w}_{0,1} & \varphi'_n \tilde{w}_{0,2} \end{bmatrix} \quad (14)$$

Each column (two blocks) of the block matrix corresponds to one layer, and each row (one block) corresponds to one polarization direction. The pre-coding in the pre-coding matrix may be expressed as:

For l=0, 1:

$$\tilde{w}_{0,l} = [v_0^{(0)} \ v_1^{(0)} \ \cdots \ v_{L_0-1}^{(0)}] \cdot \begin{bmatrix} p_{0,0,l} \cdot c_{0,0,l} & p_{0,1,l} \cdot c_{0,1,l} & \cdots & p_{0,M_0-1,l} \cdot c_{0,M_0-1,l} \\ p_{1,0,l} \cdot c_{1,0,l} & p_{1,1,l} \cdot c_{1,1,l} & \cdots & p_{1,M_0-1,l} \cdot c_{1,M_0-1,l} \\ \vdots & & & \vdots \\ p_{L_0-1,0,l} \cdot c_{L_0-1,0,l} & p_{L_0-1,1,l} \cdot c_{L_0-1,1,l} & \cdots & p_{L_0-1,M_0-1,l} \cdot c_{L_0-1,M_0-1,l} \end{bmatrix} \quad (15)$$

$$\left[ f_{k_0}^{(0)} \ f_{k_1}^{(0)} \ \cdots \ f_{k_{M_0-1}}^{(0)} \right]^H$$

For l=2:

$$\tilde{w}_{0,l} = [v_0^{(0)} \ v_1^{(0)} \ \cdots \ v_{L_1-1}^{(0)}] \cdot \begin{bmatrix} p_{0,0,l} \cdot c_{0,0,l} & p_{0,1,l} \cdot c_{0,1,l} & \cdots & p_{0,M_1-1,l} \cdot c_{0,M_1-1,l} \\ p_{1,0,l} \cdot c_{1,0,l} & p_{1,1,l} \cdot c_{1,1,l} & \cdots & p_{1,M_1-1,l} \cdot c_{1,M_1-1,l} \\ \vdots & & & \vdots \\ p_{L_1-1,0,l} \cdot c_{L_1-1,0,l} & p_{L_1-1,1,l} \cdot c_{L_1-1,1,l} & \cdots & p_{L_1-1,M_1-1,l} \cdot c_{L_1-1,M_1-1,l} \end{bmatrix} \quad (16)$$

$$\left[ f_{k_0}^{(0)} \ f_{k_1}^{(0)} \ \cdots \ f_{k_{M_1-1}}^{(0)} \right]^H$$

Here, taking the orthogonal beam group as an example, the relevant parameters in the above expression are illustrated as follows (the principle is the same in case of the frequency-domain basis vector group):

$L_0$, $L_1$ represent the number of beams in the orthogonal beam group, and the values thereof may be same or different. In this example, $L_0=4$, $L_1=2$;

l represents layer, and in this example, since the pre-coding rank is rank=3, l=0, 1, 2;

$v_i^{(n)}$ represents the $i^{th}$ beam in the orthogonal beam group n, and may use the 2D DFT vector. According to this expression, the predefinition by the system and two selected orthogonal beam groups (i.e., the first orthogonal beam group and the second orthogonal beam group), the layer 0 and layer 1 (that is, when l=0, 1) use the beams {1, 2, 7, 8} in the first orthogonal beam group; and the layer 2 (that is, when l=2) uses the beams {1, 2} in the second orthogonal beam group;

$f_{k_j}^{(n)}$ represents the frequency-domain basis vector that is compressed in frequency domain, and the DFT vector can be used. It is selected from a set of N303 DFT basis vectors, N3 is related to the number of sub-band CQIs configured by the system, and O3 is the oversampling factor. Each layer uses one frequency-domain basis vector group. The basis vectors in the frequency-domain basis vector groups of different layers may be same or different. For example, the same first frequency-domain basis vector group is used in the above layer l=0, 1, including M0 basis vectors $$\left\{ f_{k_0}^{(0)}, f_{k_1}^{(0)}, \ldots, f_{k_{M_0-1}}^{(0)} \right\}.$$

The layer l=2 uses a second frequency-domain basis vector group different from the layer l=0, 1, including M1 basis vectors $$\left\{ f_{k_0}^{(1)}, f_{k_1}^{(1)}, \ldots, f_{k_{M_1-1}}^{(1)} \right\},$$

and each frequency-domain basis vector in the second frequency-domain basis vector group used in the layer l=2 is orthogonal to each frequency-domain basis vector in the first frequency-domain basis vector group used in the layer l=0, 1. In one embodiment, M1<M0.

$p_{i,j,l}$ represents the amplitude quantization factor acting on the beam i in the orthogonal beam group, the basis vector j in the frequency-domain basis vector group, and the layer l;

$c_{i,j,l}$ represents the phase quantization factor acting on the beam i in the orthogonal beam group, the basis vector j in the frequency-domain basis vector group, and the layer l;

$\varphi_n$ and $\varphi_n'$ represent the phase adjustment factors used to adjust the phase between beams in the two polarization directions, and its value may be $$\varphi_n, \varphi_n' = e^{j\frac{\pi n}{2}},$$

where n=0, 1. The phase adjustment factors can ensure the orthogonality between the first two columns in the pre-coding matrix corresponding to the first frequency-domain basis vector group.

Figure 3:
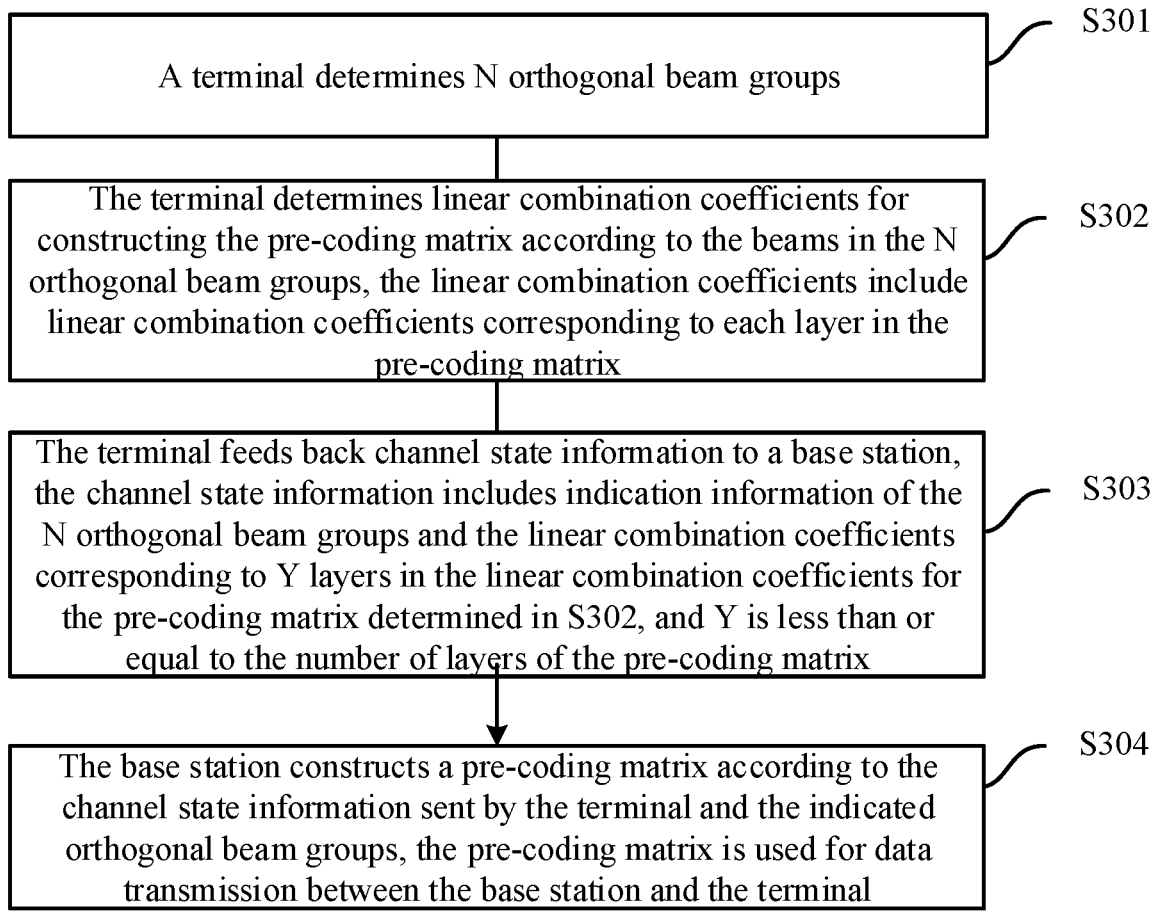
FIG. 3 is a schematic diagram of a channel state information feedback process provided by an embodiment of the present application.

Referring to FIG. 3, it is a schematic diagram of a channel state information feedback process provided by an embodiment of the—application. The process is described by taking the orthogonal beam groups as an example, and the principle of the information state information feedback process is the same in case of the frequency-domain basis vector groups.

As shown in FIG. 3, the process may include:

S301: a terminal determines N orthogonal beam groups, where N is an integer greater than or equal to 1.

Here, the terminal may determine N orthogonal beam groups based on the channel measurement result.

The terminal can determine the number of orthogonal beam groups to be used according to the value of the rank of the pre-coding matrix as well as how many layers in the pre-coding matrix of which the pre-coding can be constructed by one orthogonal beam group, and select the corresponding number of orthogonal beam groups from a candidate beam set The value of the rank of the pre-coding matrix may be indicated by the base station to the terminal, or may be determined by the terminal according to the channel measurement. The method for determining the candidate beam set can refer to the foregoing description, which will not be repeated here.

For example, if the rank of the pre-coding matrix is rank=3 and one orthogonal beam group is used to construct the pre-coding corresponding to two layers in the pre-coding matrix (that is, one orthogonal beam group is used to construct 2-column pre-coding in the pre-coding matrix), the terminal can determine that two orthogonal beam groups are needed to construct the pre-coding matrix with rank=3.

In one embodiment, the orthogonal beam groups can be selected from the candidate beam set according to the channel measurement result. For example, the terminal can calculate the reception powers of different beams according to the channel measurement result, select the first L orthogonal beams with the largest power to form the first orthogonal beam group, and select the L orthogonal beams with the second largest power to form the second orthogonal beam group. For example, the beams {1, 2, 7, 8} in FIG. 2 are selected to form the first orthogonal beam group, and the beams {3, 4, 5, 6} are selected to form the second orthogonal beam group.

S302: the terminal determines the linear combination coefficients for constructing the pre-coding matrix according to the beams in the above N orthogonal beam groups.

Here, the linear combination coefficients include linear combination coefficients corresponding to each layer in the pre-coding matrix.

In one embodiment, the linear combination coefficients include the following parameters: amplitude quantization factors and phase quantization factors. The amplitude quantization factors may include wideband amplitude quantization factor(s) and/or sub-band amplitude quantization factor(s); and the phase quantization factors may include wideband phase quantization factor(s) and/or a sub-band phase quantization factor(s).

In one embodiment, the linear combination coefficients (such as wideband amplitude quantization factor(s), sub-band amplitude quantization factor(s)) can be implemented based on the existing Type II codebook, for example, the feature vectors of the channel are projected on the orthogonal beam groups to obtain the corresponding coefficients and they are quantified.

In an example where the construction of the first kind of pre-coding matrix is used, the terminal determines the linear combination coefficients for the pre-coding corresponding to each layer in the pre-coding matrix based on the construction of the first kind of pre-coding matrix and the beams in the above N orthogonal beam groups. Different polarization directions of the same layer correspond to the same linear combination coefficient, and the layers corresponding to the same orthogonal beam group are orthogonal to each other through the phase adjustment factor.

Here, the phase adjustment factor can be determined by means of traversal search.

In the construction of the first kind of pre-coding matrix, on the one hand, the pre-coding of different polarization directions of the same layer is constructed by using the same linear combination coefficient according to the beams in the same orthogonal beam group, so it is only necessary for the pre-coding of different polarization directions of the same layer to determine and feed back the linear combination coefficient corresponding to one polarization direction in this layer, and there is no need to determine and feed back the linear combination coefficients respectively for different polarization directions, thus reducing the feedback overhead. On the other hand, the orthogonality of beams ensures that the layers corresponding to different orthogonal beam groups are orthogonal to each other.

Taking the above-mentioned construction of the pre-coding matrix with rank=3 as an example, there is no need to calculate and feed back the linear combination coefficients respectively for two different polarization directions as long as the wideband amplitude quantization factor corresponding to one polarization direction of each layer, the sub-band amplitude quantization factor corresponding to one polarization direction of each layer and the sub-band phase quantization factor corresponding to one polarization direction of each layer among the layers 0 to 2 as well as the phase adjustment factors of the layer 0 and layer 2 are determined.

Then taking the above-mentioned construction of the pre-coding matrix with rank=4 as an example, there is no need to calculate and feed back the linear combination coefficients respectively for two different polarization directions as long as the wideband amplitude quantization factor corresponding to one polarization direction of each layer, the sub-band amplitude quantization factor corresponding to one polarization direction of each layer and the sub-band phase quantization factor corresponding to one polarization direction of each layer among the layers 0 to 3 as well as the phase adjustment factors of the layer 0 and layer 2 are determined.

In an example where the construction of the second kind of pre-coding matrix is used, the terminal determines the linear combination coefficients for the pre-coding matrix based on the construction of the second kind of pre-coding matrix and the beams in the above N orthogonal beam groups. Here, among multiple layers corresponding to the same orthogonal beam group, the same polarization direction of different layers correspond to same or different linear combination coefficients, and different polarization directions of a same layer correspond to different linear combination coefficients. Further, the existing vector orthogonalization method may be used to ensure the orthogonality between layers.

Here, the existing vector orthogonalization method may be used between different layers to ensure the orthogonality between layers through the phase adjustment factors of different polarization directions in one layer.

In the construction of the second kind of pre-coding matrix, on the one hand, when one orthogonal beam group is used to construct the pre-coding of multiple layers (that is, when one orthogonal beam group is used to construct the pre-coding of at least two columns), the same polarization directions of different layers among multiple layers corresponding to the same orthogonal beam group may correspond to the same linear combination coefficient, so for the pre-coding of multiple layers corresponding to the same orthogonal beam group, it is enough to determine and feed back the linear combination coefficients corresponding to different polarization directions, and there is no need to determine and feed back the linear combination coefficients respectively for different layers, thus reducing the feedback overhead. On the other hand, different layers corresponding to the same orthogonal beam group use the existing vector orthogonalization method to ensure the orthogonality between layers, and the layers corresponding to different orthogonal beam groups ensure the orthogonality between different layers through the orthogonality between beams in the orthogonal beam groups, so the orthogonality among all the layers in the pre-coding matrix can be achieved, and the inter-layer interference is reduced.

Taking the above-mentioned construction of the pre-coding matrix with rank=3 as an example, the wideband amplitude quantization factor, sub-band amplitude quantization factor and sub-band phase quantization factor corresponding to the corresponding polarization direction can be determined respectively for the first polarization direction and the second polarization direction of the layer 0 and layer 1 corresponding to the first orthogonal beam group, and there is no need to calculate and feed back the linear combination coefficients respectively for the layer 0 and layer 1 in the same polarization direction.

Then taking the above-mentioned construction of the pre-coding matrix with rank=4 as an example, the wideband amplitude quantization factor, sub-band amplitude quantization factor and sub-band phase quantization factor corresponding to the corresponding polarization direction can be determined respectively for the first polarization direction and the second polarization direction of the layer 0 and layer 1 corresponding to the first orthogonal beam group, and the wideband amplitude quantization factor, sub-band amplitude quantization factor and sub-band phase quantization factor corresponding to the corresponding polarization direction can be determined respectively for the first polarization direction and the second polarization direction of the layer 2 and layer 3 corresponding to the second orthogonal beam group, and there is no need to calculate and feed back the linear combination coefficients respectively for two different layers in the same polarization direction.

S303: the terminal feeds back the channel state information to a base station, where the channel state information includes the indication information of the N orthogonal beam groups and the linear combination coefficients for the pre-coding matrix determined in S302.

Here, the linear combination coefficients for the pre-coding matrix fed back by the terminal include the linear combination coefficients corresponding to Y layers. The value of Y is less than or equal to the number of layers of the pre-coding matrix. In one embodiment, the selection of Y layers is predefined by the system or indicated to the terminal by high-layer signaling.

Here, the indication information of the N orthogonal beam groups is used to indicate the N orthogonal beam groups selected by the terminal and the beams included in each orthogonal beam group.

In one embodiment, the channel state information fed back by the terminal may further include the phase adjustment factors corresponding to S layers in the pre-coding matrix, where S is less than or equal to the number of layers of the pre-coding matrix. In one embodiment, the selection of S layers is predefined by the system or indicated to the terminal by high-layer signaling.

In an example where the above construction of the first kind of pre-coding matrix is used, taking the above pre-coding matrix with rank=3 as an example, the linear combination coefficients of the pre-coding fed back by the terminal may include: the wideband amplitude quantization factor $p_{0,0,i}^{(WB)}$, sub-band amplitude quantization factor $p_{0,0,i}^{(SB)}$ and sub-band phase quantization factor $c_{0,0,i}$ corresponding to the pre-codings ($\tilde{w}_{0,0}$ and $\tilde{w}_{1,0}$) of the layer 0; the wideband amplitude quantization factor $p_{0,1,i}^{(WB)}$, sub-band amplitude quantization factor $p_{0,1,i}^{(SB)}$ and sub-band phase quantization factor $c_{0,1,i}$ corresponding to the pre-codings ($\tilde{w}_{0,1}$ and $\tilde{w}_{1,1}$) of the layer 1; and the wideband amplitude quantization factor $p_{0,2,i}^{(WB)}$, sub-band amplitude quantization factor $p_{0,2,i}^{(SB)}$ and sub-band phase quantization factor $c_{0,2,i}$ corresponding to the pre-codings ($\tilde{w}_{0,2}$ and $\tilde{w}_{1,2}$) of the layer 2. They further include the phase adjustment factor $\varphi_n$ of the layer 0 and the phase adjustment factor $\varphi_n'$ of the layer 2, that is, only the phase adjustment factors of S=2 layers are fed back.

In an example where the above construction of the first kind of pre-coding matrix is used, taking the above pre-coding matrix with rank=4 as an example, the linear combination coefficients of the pre-coding fed back by the terminal may include: the wideband amplitude quantization factor $p_{0,0,i}^{(WB)}$, sub-band amplitude quantization factor $p_{0,0,i}^{(SB)}$ and sub-band phase quantization factor $c_{0,0,i}$ corresponding to the pre-codings ($\tilde{w}_{0,0}$ and $\tilde{w}_{1,0}$) of the layer 0; the wideband amplitude quantization factor $p_{0,1,i}^{(WB)}$, sub-band amplitude quantization factor $p_{0,1,i}^{(SB)}$ and sub-band phase quantization factor $c_{0,1,i}$ corresponding to the pre-codings ($\tilde{w}_{0,1}$ and $\tilde{w}_{1,1}$) of the layer 1; the wideband amplitude quantization factor $p_{0,2,i}^{(WB)}$, sub-band amplitude quantization factor $p_{0,2,i}^{(SB)}$ and sub-band phase quantization factor $c_{0,2,i}$ corresponding to the pre-codings ($\tilde{w}_{0,2}$ and $\tilde{w}_{1,2}$) of the layer 2; and the wideband amplitude quantization factor $p_{0,3,i}^{(WB)}$, sub-band amplitude quantization factor $p_{0,3,i}^{(SB)}$ and sub-band phase quantization factor $c_{0,3,i}$ corresponding to the pre-codings ($\tilde{w}_{0,3}$ and $\tilde{w}_{1,3}$) of the layer 3. They further include the phase adjustment factor $\varphi_n$ of the layer 0 and the phase adjustment factor $\varphi_n'$ of the layer 2, that is, only the phase adjustment factors of the S=2 layers are fed back.

In an example where the above construction of the second kind of pre-coding matrix is used, taking the above pre-coding matrix with rank=3 as an example, the linear combination coefficients of the pre-coding fed back by the terminal may include: the wideband amplitude quantization factor $p_{0,0,i}^{(WB)}$, sub-band amplitude quantization factor $p_{0,0,i}^{(SB)}$ and sub-band phase quantization factor $c_{0,0,i}^{(WB)}$, corresponding to the pre-codings ($\tilde{w}_{0,0}$ and $\tilde{w}_{0,1}$) of the layer 0 and layer 1 in the first polarization direction; the wideband amplitude quantization factor $p_{1,0,i}^{(WB)}$, sub-band amplitude quantization factor $p_{1,0,i}^{(SB)}$ and sub-band phase quantization factor $c_{1,0,i}$ corresponding to the pre-codings ($\tilde{w}_{1,0}$ and $\tilde{w}_{1,1}$) of the layer 0 and layer 1 in the second polarization direction; the wideband amplitude quantization factor $p_{0,2,i}^{(WB)}$, sub-band amplitude quantization factor $p_{0,2,i}^{(SB)}$ and sub-band phase quantization factor $c_{0,2,i}$ corresponding to the pre-coding $\tilde{w}_{0,2}$ of the layer 2 in the first polarization direction; and the wideband amplitude quantization factor $p_{1,2,i}^{(WB)}$, sub-band amplitude quantization factor $p_{1,2,i}^{(SB)}$ and sub-band phase quantization factor $c_{1,2,i}$ corresponding to the pre-coding $\tilde{w}_{1,2}$ of the layer 2 in the second polarization direction. As can be seen, for the layer 0 and layer 1, only the linear combination coefficients corresponding to two polarization directions of one layer are fed back, that is, only the linear combination coefficients of Y=2 layers are fed back.

In an example where the above construction of the second kind of pre-coding matrix is used, then taking the above pre-coding matrix with rank=4 as an example, the linear combination coefficients of the pre-coding fed back by the terminal may include: the wideband amplitude quantization factor $p_{0,0,i}^{(WB)}$, sub-band amplitude quantization factor $p_{0,0,i}^{(SB)}$ and sub-band phase quantization factor $c_{0,0,i}$ corresponding to the pre-codings ($\tilde{w}_{0,0}$ and $\tilde{w}_{0,1}$) of the layer 0 and layer 1 in the first polarization direction; the wideband amplitude quantization factor $p_{1,0,i}^{(WB)}$, sub-band amplitude quantization factor $p_{1,0,i}^{(SB)}$ and sub-band phase quantization factor $c_{1,0,i}$ corresponding to the pre-codings ($\tilde{w}_{1,0}$ and $\tilde{w}_{1,1}$) of the layer 0 and layer 1 in the second polarization direction; the wideband amplitude quantization factor $p_{0,2,i}^{(WB)}$, sub-band amplitude quantization factor $p_{0,2,i}^{(SB)}$ and sub-band phase quantization factor $c_{0,2,i}$ corresponding to the pre-codings ($\tilde{w}_{0,2}$ and $\tilde{w}_{0,3}$) of the layer 2 and layer 3 in the first polarization direction; and the wideband amplitude quantization factor $p_{1,2,i}^{(SB)}$, sub-band amplitude quantization factor $p_{1,2,i}^{(SB)}$ and sub-band phase quantization factor $c_{1,2,i}$ corresponding to the pre-codings ($\tilde{w}_{1,2}$ and $\tilde{w}_{1,3}$) of the layer 2 and layer 3 in the second polarization direction. As can be seen, for the layer 0 and layer 1, only the linear combination coefficients corresponding to two polarization directions of one layer are fed back; and for the layer 2 and layer 3, only the linear combination coefficients corresponding to two polarization directions of one layer are fed back, that is, only the linear combination coefficients of the Y=2 layers are fed back.

S304: the base station constructs a pre-coding matrix according to the channel state information sent by the terminal and the indicated orthogonal beam groups, where the pre-coding matrix is used for the data transmission between the base station and the terminal.

In this step, the base station construct the pre-coding matrix according to the received channel state information and the indication information of the orthogonal beam groups and according to the structure of the pre-coding matrix.

In some embodiments of the application, the terminal may determine S frequency-domain basis vector groups (S is an integer greater than or equal to 1) and determine the linear combination coefficients for constructing the pre-coding matrix according to the beam vectors in the N orthogonal beam groups and the S frequency-domain basis vector groups in S302. Here, among the S frequency-domain basis vector groups, the frequency-domain basis vectors in a frequency-domain basis vector group used by a layer with a larger layer index are selected from a frequency-domain basis vector group used by a layer with a smaller layer index. In one embodiment, the frequency-domain basis vectors in the S frequency-domain basis vector groups may or may not be orthogonal to each other, and the S frequency-domain basis vector groups may or may not be orthogonal to each other, which are not limited in the embodiments of the application.

When the frequency-domain basis vector groups are used, in some embodiments, in the step where the terminal determines the linear combination coefficients for constructing the pre-coding matrix according to the vectors in N frequency-domain basis vector groups, the terminal may determine S beam groups (S is an integer greater than or equal to 1) and determine the linear combination coefficients for constructing the pre-coding matrix according to the vectors in N frequency-domain basis vector groups and the S beam groups. Here, among the S beam groups, the beam vectors in a beam group used by a layer with a larger layer index are selected from a beam group used by a layer with a smaller layer index. In one embodiment, the beams in the S beam groups may or may not be orthogonal to each other, and the S beam groups may or may not be orthogonal to each other, which are not limited in the embodiments of the application.

Figure 4:
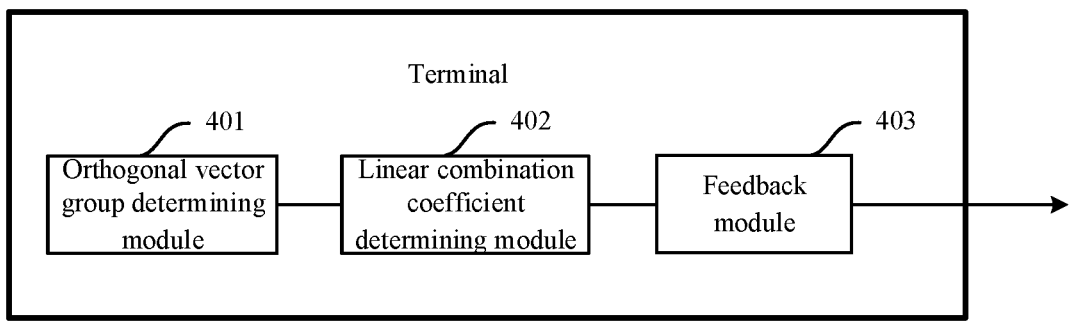
FIG. 4 is a structural schematic diagram of a terminal provided by an embodiment of the present application.

Referring to FIG. 4, it is a structural schematic diagram of a terminal provided by an embodiment of the present application. The terminal can implement the procedure described in the foregoing embodiments.

As shown in FIG. 4, the terminal may include: an orthogonal vector group determining module 401, a linear combination coefficient determining module 402, and a feedback module 403.

The orthogonal vector group determining module 401 is configured to determine N orthogonal vector groups, N is an integer greater than or equal to 1; the vectors in a same orthogonal vector group are orthogonal to each other, one orthogonal vector group is used to construct the pre-coding corresponding to M layers in a pre-coding matrix, different orthogonal vector groups construct the pre-coding corresponding to different layers in the pre-coding matrix, and M is an integer greater than or equal to 1.

The linear combination coefficient determining module 402 is configured to determine linear combination coefficients for constructing the pre-coding matrix according to the vectors in the N orthogonal vector groups; the linear combination coefficients include linear combination coefficients corresponding to each layer in the pre-coding matrix.

The feedback module 403 is configured to feed back the channel state information to a base station, the channel state information includes the indication information of the N orthogonal vector groups and linear combination coefficients corresponding to Y layers among the determined linear combination coefficients for the pre-coding matrix. Y is less than or equal to the number of layers of the pre-coding matrix.

In one embodiment, the vectors in the different orthogonal vector groups are orthogonal to each other.

In one embodiment, in the linear combination coefficients for the pre-coding matrix, different polarization directions of a same layer correspond to a same linear combination coefficient, and the layers corresponding to a same orthogonal vector group are orthogonal to each other through phase adjustment factors.

In one embodiment, in the linear combination coefficients for the pre-coding matrix and among multiple layers corresponding to a same orthogonal vector group, the same polarization direction of different layers correspond to same or different linear combination coefficients, different polarization directions of a same layer correspond to different linear combination coefficients, and different layers are orthogonal to each other.

In one embodiment, the channel state information further includes:
phase adjustment factors corresponding to S layers in the pre-coding matrix determined by the terminal. S is less than or equal to the number of layers of the pre-coding matrix.

In one embodiment, the linear combination coefficients include the following parameters:
amplitude quantization factors including wideband amplitude quantization factor(s) and/or sub-band amplitude quantization factor(s);
phase quantization factors including wideband phase quantization factor(s) and/or sub-band phase quantization factor(s).

In one embodiment, the number of vectors in each of the N orthogonal vector groups is same or different.

In one embodiment, the orthogonal vector group is an orthogonal beam group which includes at least one beam vector; or, the orthogonal vector group is a frequency-domain basis vector group which includes at least one frequency-domain basis vector.

In one embodiment, when the orthogonal vector groups are orthogonal beam groups, the linear combination coefficient determining module 402 is specifically configured to:
determine S frequency-domain basis vector groups, S being an integer greater than or equal to 1;
determine linear combination coefficients for constructing the pre-coding matrix according to beam vectors in the N orthogonal beam groups and the S frequency-domain basis vector groups.

In one embodiment, among the S frequency-domain basis vector groups, the frequency-domain basis vectors in a frequency-domain basis vector group used by a layer with a larger layer index are selected from a frequency-domain basis vector group used by a layer with a smaller layer index.

In one embodiment, when the orthogonal vector groups are frequency-domain basis vector groups, the linear combination coefficient determining module 402 is specifically configured to:
determine S beam groups, S being an integer greater than or equal to 1;
determine linear combination coefficients for constructing the pre-coding matrix according to vectors in the N frequency-domain basis vector groups and the S beam groups.

In one embodiment, among the S beam groups, the beam vectors in a beam group used by a layer with a larger layer index are selected from a beam group used by a layer with a smaller layer index.

Figure 5:
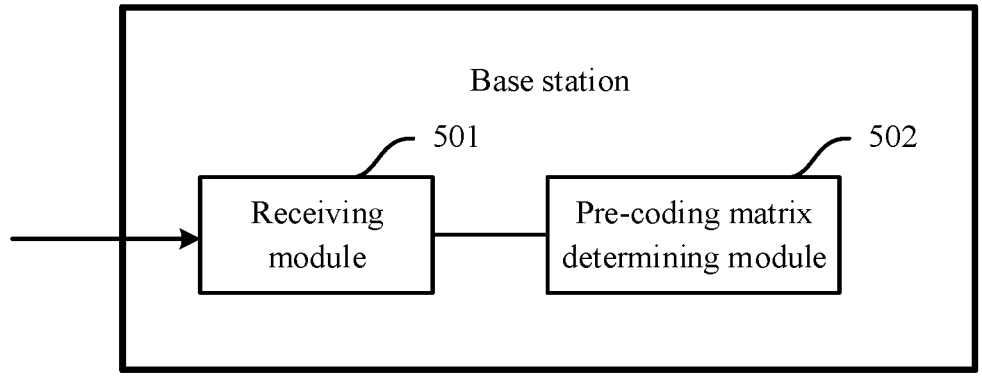
FIG. 5 is a structural schematic diagram of a base station provided by an embodiment of the present application.

Referring to FIG. 5, it is a structural schematic diagram of a base station provided by an embodiment of the present application. The terminal can implement the procedure described in the foregoing embodiments.

As shown in FIG. 5, the base station may include: a receiving module 501 and a pre-coding matrix determining module 502.

The receiving module 501 is configured to receive the channel state information fed back by a terminal. The channel state information includes indication information of N orthogonal vector groups and linear combination coefficients corresponding to Y layers among linear combination coefficients determined by the terminal for constructing a pre-coding matrix, Y is less than or equal to the number of layers of the pre-coding matrix. Among the N orthogonal vector groups, vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and N and M are both integers greater than or equal to 1.

The pre-coding matrix determining module 502 is configured to construct the pre-coding matrix according to the channel state information.

In one embodiment, the vectors in the different orthogonal vector groups are orthogonal to each other.

In one embodiment, in the linear combination coefficients for the pre-coding matrix, different polarization directions of a same layer correspond to a same linear combination coefficient, and the layers corresponding to a same orthogonal vector group are orthogonal to each other through phase adjustment factors.

In one embodiment, in the linear combination coefficients for the pre-coding matrix and among multiple layers corresponding to a same orthogonal vector group, the same polarization direction of different layers correspond to same or different linear combination coefficients, different polarization directions of a same layer correspond to different linear combination coefficients, and different layers are orthogonal to each other.

In one embodiment, the channel state information further includes:
phase adjustment factors corresponding to S layers in the pre-coding matrix determined by the terminal. S is less than or equal to the number of layers of the pre-coding matrix.

In one embodiment, the linear combination coefficients include the following parameters:

amplitude quantization factors including wideband amplitude quantization factor(s) and/or a sub-band amplitude quantization factor(s);

phase quantization factors including wideband phase quantization factor(s) and/or sub-band phase quantization factor(s).

In one embodiment, the number of vectors in each of the N orthogonal vector groups is same or different.

In one embodiment, the orthogonal vector group is an orthogonal beam group which includes at least one beam vector;

or, the orthogonal vector group is a frequency-domain basis vector group which includes at least one frequency-domain basis vector.

Figure 6:
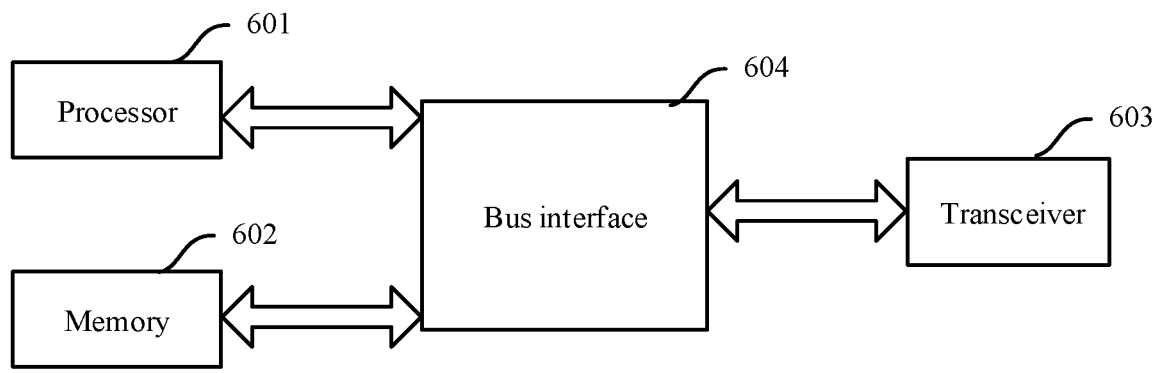
FIG. 6 is a structural schematic diagram of a communication device provided by an embodiment of the present application.

Referring to FIG. 6, it is a structural schematic diagram of a communication device provided by an embodiment of the present application. This communication device can implement the terminal-side process described in the foregoing embodiments. As shown, this communication device may include: a processor 601, a memory 602, a transceiver 603 and a bus interface 604.

The processor 601 is responsible for managing the bus architecture and general processing, and the memory 602 may store the data used by the processor 601 when performing the operations. The transceiver 603 is configured to receive and send the data under the control of the processor 601.

The bus architecture may include any numbers of interconnected buses and bridges, and specifically link various circuits of one or more processors represented by the processor 601 and the memory represented by the memory 602. The bus architecture may further link various other circuits such as peripheral device, voltage regulator and power management circuit, which are all well known in the art and thus will not be further described again herein. The bus interface 604 provides an interface. The processor 601 is responsible for managing the bus architecture and general processing, and the memory 602 may store the data used by the processor 601 when performing the operations.

The procedure disclosed by the embodiments of the application may be applied in the processor 601 or implemented by the processor 601. In the implementation process, each step of the processing flow may be completed by the integrated logic circuit of hardware in the processor 601 or the instruction in the form of software. The processor 601 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 602, and the processor 601 reads the information in the memory 602 and completes the steps of the signal processing flow in combination with its hardware.

Specifically, the processor 601 is configured to read the program in the memory 602 and:

determine N orthogonal vector groups, N being an integer greater than or equal to 1; here vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and M is an integer greater than or equal to 1;

determine linear combination coefficients for constructing the pre-coding matrix according to the vectors in the N orthogonal vector groups; here the linear combination coefficients include linear combination coefficients corresponding to each layer in the pre-coding matrix;

feed back the channel state information to a base station, the channel state information including indication information of the N orthogonal vector groups and linear combination coefficients corresponding to Y layers among the determined linear combination coefficients for the pre-coding matrix, here Y is less than or equal to the number of layers of the pre-coding matrix.

In one embodiment, the vectors in the different orthogonal vector groups are orthogonal to each other.

In one embodiment, in the linear combination coefficients for the pre-coding matrix, different polarization directions of a same layer correspond to a same linear combination coefficient, and the layers corresponding to a same orthogonal vector group are orthogonal to each other through phase adjustment factors.

In one embodiment, in the linear combination coefficients for the pre-coding matrix and among multiple layers corresponding to a same orthogonal vector group, the same polarization direction of different layers correspond to same or different linear combination coefficients, different polarization directions of a same layer correspond to different linear combination coefficients, and different layers are orthogonal to each other.

In one embodiment, the channel state information further includes:

phase adjustment factors corresponding to S layers in the pre-coding matrix determined by the terminal, here S is less than or equal to the number of layers of the pre-coding matrix.

In one embodiment, the linear combination coefficients include the following parameters:

amplitude quantization factors including wideband amplitude quantization factor(s) and/or sub-band amplitude quantization factor(s);

phase quantization factors including wideband phase quantization factor(s) and/or sub-band phase quantization factor(s).

In one embodiment, the number of vectors in each of the N orthogonal vector groups is same or different.

In one embodiment, the orthogonal vector group is an orthogonal beam group which includes at least one beam vector; or, the orthogonal vector group is a frequency-domain basis vector group which includes at least one frequency-domain basis vector.

In one embodiment, when the orthogonal vector groups are orthogonal beam groups, the processor 601 is specifically configured to:

determine S frequency-domain basis vector groups, S being an integer greater than or equal to 1;

determine linear combination coefficients for constructing the pre-coding matrix according to beam vectors in the N orthogonal beam groups and the S frequency-domain basis vector groups.

In one embodiment, among the S beam groups, the beam vectors in a beam group used by a layer with a larger layer index are selected from a beam group used by a layer with a smaller layer index.

In one embodiment, when the orthogonal vector groups are frequency-domain basis vector groups, the processor 601 is specifically configured to:

determine S beam groups, S being an integer greater than or equal to 1;

determine linear combination coefficients for constructing the pre-coding matrix according to vectors in the N frequency-domain basis vector groups and the S beam groups.

In one embodiment, among the S beam groups, the beam vectors in a beam group used by a layer with a larger layer index are selected from a beam group used by a layer with a smaller layer index.

Figure 7:
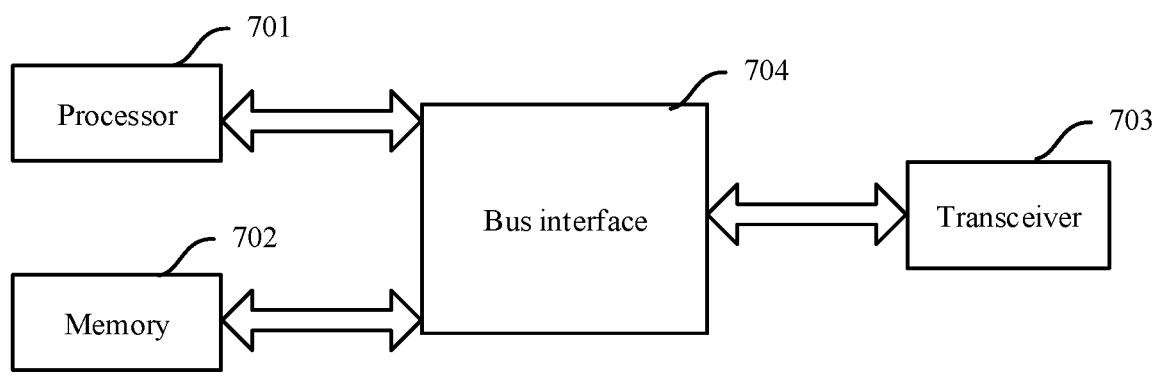
FIG. 7 is a structural schematic diagram of a communication device provided by another embodiment of the present application.

Referring to FIG. 7, it is a structural schematic diagram of a communication device provided by an embodiment of the present application. This communication device can implement the base station-side process described in the foregoing embodiments. As shown, this communication device may include: a processor 701, a memory 702, a transceiver 703 and a bus interface 704.

The processor 701 is responsible for managing the bus architecture and general processing, and the memory 702 may store the data used by the processor 701 when performing the operations. The transceiver 703 is configured to receive and send the data under the control of the processor 701.

The bus architecture may include any numbers of interconnected buses and bridges, and specifically link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface 704 provides an interface. The processor 701 is responsible for managing the bus architecture and general processing, and the memory 702 may store the data used by the processor 701 when performing the operations.

The procedure disclosed by the embodiment of the present application may be applied in the processor 701 or implemented by the processor 701. In the implementation process, each step of the processing flow may be completed by the integrated logic circuit of hardware in the processor 701 or the instruction in the form of software. The processor 701 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 702, and the processor 701 reads the information in the memory 702 and completes the steps of the signal processing flow in combination with its hardware.

Specifically, the processor 701 is configured to read the program in the memory 702 and:

receive the channel state information fed back by a terminal, here the channel state information includes indication information of N orthogonal vector groups and linear combination coefficients corresponding to Y layers among linear combination coefficients determined by the terminal for constructing a pre-coding matrix, Y is less than or equal to the number of layers of the pre-coding matrix; among the N orthogonal vector groups, vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and N and M are both integers greater than or equal to 1;

construct the pre-coding matrix according to the channel state information.

In one embodiment, the vectors in the different orthogonal vector groups are orthogonal to each other.

In one embodiment, in the linear combination coefficients for the pre-coding matrix, different polarization directions of a same layer correspond to a same linear combination coefficient, and the layers corresponding to a same orthogonal vector group are orthogonal to each other through phase adjustment factors.

In one embodiment, in the linear combination coefficients for the pre-coding matrix and among multiple layers corresponding to a same orthogonal vector group, the same polarization direction of different layers correspond to same or different linear combination coefficients, different polarization directions of a same layer correspond to different linear combination coefficients, and different layers are orthogonal to each other.

In one embodiment, the channel state information further includes:

phase adjustment factors corresponding to S layers in the pre-coding matrix determined by the terminal, here S is less than or equal to the number of layers of the pre-coding matrix.

In one embodiment, the linear combination coefficients include the following parameters:

amplitude quantization factors including wideband amplitude quantization factor(s) and/or sub-band amplitude quantization factor(s);

phase quantization factors including wideband phase quantization factor(s) and/or sub-band phase quantization factor(s).

In one embodiment, the number of vectors in each of the N orthogonal vector groups is same or different.

In one embodiment, the orthogonal vector group is an orthogonal beam group which includes at least one beam vector;

or, the orthogonal vector group is a frequency-domain basis vector group which includes at least one frequency-domain basis vector.

An embodiment of the present application further provides a computer readable storage medium. The computer readable storage medium stores the computer executable instructions which are configured to cause the computer to perform the process executed at the terminal side in the foregoing embodiments.

An embodiment of the present application further provides a computer readable storage medium. The computer readable storage medium stores the computer executable instructions which are configured to cause the computer to perform the process executed at the base station side in the foregoing embodiments.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, additional alterations and modifications to these embodiments can be made. Thus, the attached claims are intended to be interpreted to include the embodiments as well as all the alterations and modifications falling within the scope of the present application.

What is claimed is:

1. A method for feeding back channel state information, comprising:
   determining, by a terminal, N orthogonal vector groups, N being an integer greater than or equal to 1; wherein vectors in a same orthogonal vector group are orthogonal to each other, one orthogonal vector group is used to construct pre-coding corresponding to M layers in a pre-coding matrix, different orthogonal vector groups construct pre-coding corresponding to different layers in the pre-coding matrix, and M is an integer greater than or equal to 1;
   determining, by the terminal, linear combination coefficients for constructing the pre-coding matrix according to vectors in the N orthogonal vector groups; wherein the linear combination coefficients comprise linear combination coefficients corresponding to each layer in the pre-coding matrix; and
   feeding back, by the terminal, channel state information to a base station, the channel state information comprising indication information of the N orthogonal vector groups and linear combination coefficients corresponding to Y layers among the determined linear combination coefficients for the pre-coding matrix, wherein Y is less than or equal to the number of layers of the pre-coding matrix.

2. The method of claim 1, wherein vectors in the different orthogonal vector groups are orthogonal to each other.

3. The method of claim 1, wherein in the linear combination coefficients for the pre-coding matrix, different polarization directions of a same layer correspond to a same linear combination coefficient, and layers corresponding to a same orthogonal vector group are orthogonal to each other through phase adjustment factors.

4. The method of claim 1, wherein in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

5. The method of claim 1, wherein the channel state information further comprises:
   phase adjustment factors corresponding to S layers in the pre-coding matrix determined by the terminal, wherein S is less than or equal to the number of layers of the pre-coding matrix.

6. The method of claim 1, wherein the linear combination coefficients comprise following parameters:
   amplitude quantization factors comprising a wideband amplitude quantization factor and/or a sub-band amplitude quantization factor;
   phase quantization factors comprising a wideband phase quantization factor and/or a sub-band phase quantization factor.

7. The method of claim 1, wherein the number of vectors in each of the N orthogonal vector groups is same or different; and
   the orthogonal vector groups each is an orthogonal beam group which comprises at least one beam vector; or
   the orthogonal vector groups each is a frequency-domain basis vector group which comprises at least one frequency-domain basis vector.

8. The method of claim 7, wherein when the orthogonal vector groups are orthogonal beam groups, said determining, by the terminal, linear combination coefficients for constructing the pre-coding matrix according to vectors in the N orthogonal vector groups, comprises:
   determining, by the terminal, S frequency-domain basis vector groups, S being an integer greater than or equal to 1; and
   determining, by the terminal, linear combination coefficients for constructing the pre-coding matrix according to beam vectors in the N orthogonal beam groups and the S frequency-domain basis vector groups.

9. The method of claim 8, wherein among the S frequency-domain basis vector groups, frequency-domain basis vectors in a frequency-domain basis vector group used by a layer with a larger layer index are selected from a frequency-domain basis vector group used by a layer with a smaller layer index.

10. The method of claim 7, wherein when the orthogonal vector groups are frequency-domain basis vector groups, said determining, by the terminal, linear combination coefficients for constructing the pre-coding matrix according to vectors in the N orthogonal vector groups, comprises:

determining, by the terminal, S beam groups, S being an integer greater than or equal to 1; and determining, by the terminal, linear combination coefficients for constructing the pre-coding matrix according to vectors in the N frequency-domain basis vector groups and the S beam groups.

11. The method of claim 10, wherein among the S beam groups, beam vectors in a beam group used by a layer with a larger layer index are selected from a beam group used by a layer with a smaller layer index.

12. A method for determining a pre-coding matrix, comprising:

receiving, by a base station, channel state information fed back by a terminal, wherein the channel state information comprises indication information of N orthogonal vector groups and linear combination coefficients corresponding to Y layers among linear combination coefficients determined by the terminal for constructing a pre-coding matrix, Y is less than or equal to the number of layers of the pre-coding matrix; among the N orthogonal vector groups, vectors in a same orthogonal vector group are orthogonal to each other, one orthogonal vector group is used to construct pre-coding corresponding to M layers in the pre-coding matrix, different orthogonal vector groups construct pre-coding corresponding to different layers in the pre-coding matrix, and N and M are both integers greater than or equal to 1; and constructing, by the base station, the pre-coding matrix according to the channel state information.

13. The method of claim 12, wherein vectors in the different orthogonal vector groups are orthogonal to each other.

14. The method of claim 12, wherein in the linear combination coefficients for the pre-coding matrix, different polarization directions of a same layer correspond to a same linear combination coefficient, and layers corresponding to a same orthogonal vector group are orthogonal to each other through phase adjustment factors.

15. The method of claim 12, wherein in the linear combination coefficients for the pre-coding matrix and among multiple layers corresponding to a same orthogonal vector group, a same polarization direction of different layers correspond to same or different linear combination coefficients, different polarization directions of a same layer correspond to different linear combination coefficients, and different layers are orthogonal to each other.

16. The method of claim 12, wherein the channel state information further comprises:

phase adjustment factors corresponding to S layers in the pre-coding matrix determined by the terminal, wherein S is less than or equal to the number of layers of the pre-coding matrix.

17. The method of claim 12, wherein the linear combination coefficients comprise following parameters:

amplitude quantization factors comprising a wideband amplitude quantization factor and/or a sub-band amplitude quantization factor;

phase quantization factors comprising a wideband phase quantization factor and/or a sub-band phase quantization factor.

18. The method of claim 12, wherein the number of vectors in each of the N orthogonal vector groups is same or different; and the orthogonal vector groups each is an orthogonal beam group which comprises at least one beam vector; or the orthogonal vector groups each is a frequency-domain basis vector group which comprises at least one frequency-domain basis vector.

19. A communication device, comprising: a processor, a memory and a transceiver; wherein the processor is configured to read a program in the memory to perform the method of claim 1.

20. A communication device, comprising: a processor, a memory and a transceiver; wherein the processor is configured to read a program in the memory to perform the method of claim 12.

* * * * *